(12) United States Patent
Toriyama et al.

(10) Patent No.: US 7,487,469 B2
(45) Date of Patent: Feb. 3, 2009

(54) INFORMATION PROCESSING PROGRAM AND INFORMATION PROCESSING APPARATUS

(75) Inventors: Kazuyoshi Toriyama, Kyoto (JP); Tomoaki Kuroume, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 489 days.

(21) Appl. No.: 11/397,568

(22) Filed: Apr. 5, 2006

(65) Prior Publication Data

US 2007/0083828 A1      Apr. 12, 2007

(30) Foreign Application Priority Data

Jun. 15, 2005      (JP) .............................. 2005-175708

(51) Int. Cl.
    *G06F 3/00* (2006.01)
(52) U.S. Cl. .................... 715/863; 715/864; 715/816
(58) Field of Classification Search ............... 715/700, 715/705, 776, 780, 816, 839, 848–851, 855, 715/863–866, 961, 977
See application file for complete search history.

(56) References Cited

U.S. PATENT DOCUMENTS

| | | | | |
|---|---|---|---|---|
| 5,463,725 | A | * | 10/1995 | Henckel et al. ............. 715/776 |
| 5,697,793 | A | * | 12/1997 | Huffman et al. ............ 434/317 |
| 5,844,561 | A | * | 12/1998 | Tanimoto et al. ........... 715/703 |
| 5,847,698 | A | * | 12/1998 | Reavey et al. .............. 345/173 |
| 6,148,286 | A | * | 11/2000 | Siegel ........................ 704/270 |
| 6,320,591 | B1 | * | 11/2001 | Griencewic ................. 345/582 |
| 6,487,424 | B1 | * | 11/2002 | Kraft et al. .................. 455/566 |
| 6,632,094 | B1 | * | 10/2003 | Falcon et al. ............... 434/178 |
| 6,651,220 | B1 | * | 11/2003 | Penteroudakis et al. ..... 715/236 |
| 6,692,170 | B2 | * | 2/2004 | Abir ........................... 400/472 |
| 6,762,775 | B2 | * | 7/2004 | Ho ............................. 715/776 |
| 6,961,722 | B1 | * | 11/2005 | Bruecken ..................... 707/3 |
| 7,039,868 | B2 | * | 5/2006 | Yanatsubo ................... 715/712 |
| 7,185,274 | B1 | * | 2/2007 | Rubin et al. ................ 715/205 |
| 7,203,908 | B1 | * | 4/2007 | Nakajima et al. ........... 715/758 |

(Continued)

FOREIGN PATENT DOCUMENTS

JP      63-188753      12/1988

(Continued)

OTHER PUBLICATIONS

Issue A1, "MONO magazine No. 516", World Photo Press Co., Apr. 16, 2005, pp. 36-37.

(Continued)

*Primary Examiner*—Sy D Luu
(74) *Attorney, Agent, or Firm*—Nixon & Vanderhye P.C.

(57) ABSTRACT

A part of entry words included in entry word data is displayed in an entry word candidate display area 42. When the user taps a desired entry word in this state, a meaning of that entry word is displayed in an explanation sentence display area 40. When the user slides a stick in the entry word candidate display area 42, an animation of a page being turned is displayed, and the entry words displayed in the entry word candidate display area 42 are replaced with new entry words. This makes it simpler and faster to perform an instruction to switch entry words displayed on the screen and an instruction to select an entry word displayed on the screen and display a meaning thereof on the screen.

22 Claims, 23 Drawing Sheets

U.S. PATENT DOCUMENTS

| | | | | |
|---|---|---|---|---|
| 7,254,773 | B2* | 8/2007 | Bates et al. | 715/256 |
| 7,340,470 | B2* | 3/2008 | Bruecken | 707/10 |
| 7,355,595 | B2* | 4/2008 | Bathiche et al. | 345/173 |
| 2002/0019950 | A1* | 2/2002 | Huffman et al. | 713/300 |
| 2002/0150869 | A1* | 10/2002 | Shpiro | 434/156 |
| 2002/0184189 | A1* | 12/2002 | Hay et al. | 707/1 |
| 2003/0014674 | A1* | 1/2003 | Huffman et al. | 713/300 |
| 2003/0020761 | A1* | 1/2003 | Yanatsubo | 345/833 |
| 2004/0027312 | A1* | 2/2004 | Owada et al. | 345/8 |
| 2004/0201569 | A1* | 10/2004 | Seet et al. | 345/156 |
| 2004/0233235 | A1* | 11/2004 | Rubin et al. | 345/738 |
| 2004/0267537 | A1* | 12/2004 | Nakamura et al. | 704/276 |
| 2005/0069849 | A1* | 3/2005 | McKinney et al. | 434/178 |
| 2005/0082359 | A1* | 4/2005 | Marggraff et al. | 235/375 |
| 2005/0104866 | A1* | 5/2005 | Inui | 345/173 |
| 2005/0151742 | A1* | 7/2005 | Hong et al. | 345/473 |
| 2005/0203727 | A1* | 9/2005 | Heiner et al. | 704/2 |
| 2005/0204889 | A1* | 9/2005 | Swingle et al. | 84/100 |
| 2006/0133664 | A1* | 6/2006 | Hong et al. | 382/154 |
| 2006/0136813 | A1* | 6/2006 | Hong et al. | 715/512 |
| 2006/0156233 | A1* | 7/2006 | Nurmi | 715/532 |
| 2006/0173806 | A1* | 8/2006 | Bruecken | 707/1 |
| 2006/0230340 | A1* | 10/2006 | Parsons et al. | 715/514 |
| 2007/0048717 | A1* | 3/2007 | Hsieh | 434/317 |
| 2007/0168182 | A1* | 7/2007 | Abe | 704/10 |

FOREIGN PATENT DOCUMENTS

| | | |
|---|---|---|
| JP | 2000-163193 | 6/2000 |
| JP | 2001-134568 | 5/2001 |
| JP | 2002-182815 | 6/2002 |
| JP | 2002-323850 | 11/2002 |
| JP | 2003-140802 | 5/2003 |
| JP | 2004-62227 | 2/2004 |

OTHER PUBLICATIONS

Issue A2, "MONO magazine No. 520", World Photo Press Co., Jun. 16, 2005, p. 172.

Issue B1, "Goods Press the July issue", Tokuma Shoten Publishing Co., Ltd., Jun. 6, 2005, p. 130.

Printing A1, http://www.nintendo.co.jp/ds/adjj/index.html, Nintendo Co., Ltd., May 31, 2005.

* cited by examiner

FIG. 14

ENTRY WORD DATA 52

| ORDER | ENTRY WORD |
|---|---|
| 1 | a |
| 2 | aam |
| 3 | aard-vark |
| 4 | aard-wolf |
| 5 | aaronic |
| 6 | aaron's rod |
| 7 | ab |
| ... | ... |
| 10530 | zymolysis |
| 10531 | zymolytic |
| 10532 | zymosis |
| 10533 | zymotic |
| 10534 | zymurgy |
| 10535 | zyrian |

FIG. 15

EXPLANATION DATA 53

| ORDER | EXPLANATION SENTENCE |
|---|---|
| 1 | EXPLANATION SENTENCE OF "a" |
| 2 | EXPLANATION SENTENCE OF "aam" |
| 3 | EXPLANATION SENTENCE OF "aard-vark" |
| 4 | EXPLANATION SENTENCE OF "aard-wolf" |
| 5 | EXPLANATION SENTENCE OF "aaronic" |
| 6 | EXPLANATION SENTENCE OF "aaron's rod" |
| 7 | EXPLANATION SENTENCE OF "ab" |
| ⋮ | ⋮ |
| 10530 | EXPLANATION SENTENCE OF "zymolysis" |
| 10531 | EXPLANATION SENTENCE OF "zymolytic" |
| 10532 | EXPLANATION SENTENCE OF "zymosis" |
| 10533 | EXPLANATION SENTENCE OF "zymotic" |
| 10534 | EXPLANATION SENTENCE OF "zymurgy" |
| 10535 | EXPLANATION SENTENCE OF "zyrian" |

FIG. 17

| ORDER | ENTRY WORD |
|---|---|
| 1 | a |
| ... | ... |
| 196 | balky |
| 197 | ball |
| 198 | ballad |
| 199 | ballade |
| 200 | ballader |
| 201 | ballad monger |
| 202 | balladry |
| 203 | ballahoo |
| 204 | ballarag |
| 205 | ballast |
| 206 | ballastage |
| 207 | ballasting |
| 208 | ballatry |
| 209 | ballet |
| 210 | ball-flower |
| 211 | ballista |
| 212 | ballister |
| 213 | ballistic |
| 214 | ballistics |
| 215 | ballium |
| ... | ... |
| 10535 | zyrian |

- 196 balky ← ENTRY WORD CORRESPONDING TO THE CHARACTER STRING INPUT TO THE TEXT BOX
- 196–200: LEFT PAGE (N'TH PAGE)
- 201–205: RIGHT PAGE ((N+1)'TH PAGE)
- 206–210: LEFT PAGE ((N+2)'TH PAGE)
- 211–215: RIGHT PAGE ((N+3)'TH PAGE)

INFORMATION PROCESSING PROGRAM AND INFORMATION PROCESSING APPARATUS

CROSS REFERENCE TO RELATED APPLICATION

The disclosure of Japanese Patent Application No. 2005-175708 is incorporated herein by reference.

BACKGROUND OF THE INVENTION

1. Field of the Invention

The present invention relates to an information processing program and an information processing apparatus, and in particular to an information processing program and an information processing apparatus for displaying a list of entry words such as, for example, terms registered in an electronic dictionary or an index of an electronic book on a screen and displaying an meaning or a sentence corresponding to the entry word selected by the user.

2. Description of the Background Art

There are conventional technologies for, when a list of entry words cannot entirely be displayed at a time on a screen, displaying only a part of the list on the screen and allowing the rest of the list to be displayed by an operation by the user of a scroll bar (see, for example, patent document 1: Japanese Laid-Open Utility Model Publication No. 63-188753). According to patent document 1, a part of the list of entry words is displayed on a touch panel display, and the entry words displayed on the screen are changed by a touch operation by the user on the scroll bar, which is also displayed on the touch panel. The user can display a desired entry word on the screen by operating the scroll bar, and then display a meaning of the entry word by touching the entry word.

However, according to the technology described in Japanese Laid-Open Utility Model Publication No. 63-188753, it is absolutely necessary to touch the scroll bar in order to change the entry words displayed on the screen. This requires the user to operate the scroll bar while checking whether the desired entry word is displayed or not. This causes a problem that the line of sight needs to be frequently moved and makes the user's eyes tired. In addition, for example, in order to find the meanings of many entry words, the procedure of operating the scroll bar and touching an entry word to check the meaning thereof and then again operating the scroll bar and touching another entry word to check the meaning thereof needs to be repeated. The line of sight and also the fingers of the user need to be frequently moved between the scroll bar and each entry word. This has a problem of poor operability.

SUMMARY OF THE INVENTION

Therefore, an object of the present invention is to make it simpler and faster to perform an instruction to switch entry words displayed on the screen and an instruction to select an entry word displayed on the screen and display a meaning thereof on the screen.

The present invention has the following features to attain the object mentioned above. The reference numerals in parentheses indicate the correspondence with the embodiment described later for easier understanding of the present invention, and do not limit the present invention in any way.

A first aspect of the present invention is directed to a computer readable storage medium having stored thereon an information processing program for causing a computer (21), connected to display means (11, 12), coordinate set input means (15) for inputting a coordinate set input instruction from a user, entry word data storage means (24, 52) for storing entry word data including a plurality of entry words, and explanation data storage means (24, 53) for storing explanation data associated with each of the plurality of entry words, to function as first display control means, entry word change operation detection means, second display control means, and third display control means. The first display control means is for displaying, in an entry word candidate display area, a part of the plurality of entry words included in the entry word data (S18). The entry word change operation detection means is for determining at least one of (a) whether or not a slide operation has been performed in the entry word candidate display area and (b) whether or not a long push operation has been performed in the entry word candidate display area, based on an output signal from the coordinate set input means, and detecting an entry word change operation by the user based on the determination result (S38, S54). The second display control means is for, when the entry word change operation by the user is detected by the entry word change operation detection means, erasing at least one entry word displayed in the entry word candidate display area and displaying a new entry word (S84, S96). The third display control means is for, when the coordinate set input instruction is terminated on an entry word displayed in the entry word candidate display area based on an output signal from the coordinate set input means, reading the explanation data corresponding to the entry word and displaying an explanation of the entry word on the display means under a condition that no new entry word has been displayed by the second display control means at least in a time period from a start of the coordinate set input instruction until a termination thereof (S72).

The coordinate set input means includes at least a pointing device such as a touch panel, a mouse or the like. The coordinate set input instruction by the user is input by touching the touch panel with a finger, a stick or the like, or pushing a button provided on the mouse. The slide operation is an operation of changing an input coordinate set without discontinuing the coordinate set input instruction, and the long push operation is an operation of continuing the coordinate set input instruction without discontinuing the same.

In a variation of the first aspect, the third display control means may display an explanation of the entry word when the following condition is fulfilled in addition to the condition that no new entry word has been displayed by the second display control means at least in a time period from the start of the coordinate set input instruction until the termination thereof: (a) the distance from the coordinate set at which the coordinate set input instruction is started to the coordinate set at which the coordinate set input instruction is terminated is less than a predetermined distance; or (b) the time period from the start of the coordinate set input instruction until the termination thereof is less than a predetermined time period. In another variation, the third display control means may display an explanation of the entry word when the following conditions are both fulfilled in addition to the above-described condition regarding the new entry word: (a) the distance from the coordinate set at which the coordinate set input instruction is started to the coordinate set at which the coordinate set input instruction is terminated is less than a predetermined distance; and (b) the time period from the start of the coordinate set input instruction until the termination thereof is less than a predetermined time period.

In a second aspect of the present invention based on the first aspect, when the slide operation is performed by a predetermined distance or longer in the entry word candidate display area, the entry word change operation detection means detects the slide operation as the entry word change operation by the user.

In a third aspect of the present invention based on the first aspect, when the long push operation is performed for a predetermined time period or longer in the entry word candidate display area, the entry word change operation detection means detects the long push operation as the entry word change operation by the user.

In a variation of the third aspect, when a coordinate set input is performed on a coordinate set in a predetermined area for example, a predetermined area based on the coordinate set at which the coordinate set input instruction is started) for a predetermined time period, it may be determine that the long push operation has been performed. Alternatively, only when the coordinate set input instruction is kept for a predetermined time period, it may be determined that the long push operation has been performed. (In this case, even when the indicated coordinate set is moved, it is determined that the long push operation has been performed.) Still alternatively, when the movement of the indicated coordinate set at a speed equal to or lower than a predetermined speed is kept for a predetermined time period, it may be determined that the long push operation has been performed.

In a fourth aspect of the present invention based on the first aspect, when the slide operation is performed by a predetermined distance or longer in the entry word candidate display area, or when the long push operation is performed for a predetermined time period or longer in the entry word candidate display area, the entry word change operation detection means detects the slide operation or the long push operation as the entry word change operation by the user.

In a fifth aspect of the present invention based on the first aspect, the first display control means displays the entry words in the entry word candidate display area in the form of an open book.

In a sixth aspect of the present invention based on the first aspect, the second display control means erases all the entry words displayed in the entry word candidate display area and displays new entry words.

In a seventh aspect of the present invention based on the sixth aspect, the entry word data includes the plurality of entry words which are sequentially ordered from a first entry word to a final entry word. The second display control means newly displays an entry word subsequent to the entry words currently displayed in the entry word candidate display area.

In an eighth aspect of the present invention based on the sixth aspect, the information processing program further causes the computer to function as animation control means for, when the second display control means changes entry words displayed in the entry word candidate display area, displaying an animation of a page of a book being turned in the entry word candidate display area; and sound control means for outputting a sound of a page of a book being turned along with the animation displayed by the animation control means.

In a ninth aspect of the present invention based on the first aspect, the information processing program further causes the computer to function as search data input means for inputting search data based on an input operation by the user. The entry word data includes the plurality of entry words which are sequentially ordered from a first entry word to a final entry word; and the first display control means specifies one entry word corresponding to the search data from the plurality of entry words and displays the one corresponding entry word and at least one entry word subsequent to the one corresponding entry word.

In a tenth aspect of the present invention based on the first aspect, the second display control means executes entry word change processing repeatedly while the user keeps the coordinate set input instruction after the long push operation is detected by the entry word change operation detection means.

In an eleventh aspect of the present invention based on the tenth aspect, a period of the entry word change processing by the second display control means is shortened as time passes.

In a twelfth aspect of the present invention based on the second aspect, the entry word data includes the plurality of entry words which are sequentially ordered from a first entry word to a final entry word. The entry word change operation detection means detects a direction of the slide operation when the slide operation is performed by the predetermined distance or longer in the entry word candidate display area. (a) When the direction of the slide operation detected by the entry word change operation detection means is a first direction, the second display control means erases at least an entry word displayed at a most forward position in the entry word candidate display area, and displays a new entry word subsequent to an entry word displayed at a most rearward position in the entry word candidate display area; and (b) when the direction of the slide operation detected by the entry word change operation detection means is a second direction opposite to the first direction, the second display control means erases at least an entry word displayed at the most rearward position in the entry word candidate display area, and displays a new entry word preceding an entry word displayed at the most forward position in the entry word candidate display area.

In a thirteenth third aspect of the present invention based on the second aspect, the second display control means executes entry word change processing repeatedly while the user keeps the coordinate set input instruction after the slide operation by the predetermined distance or longer is detected by the entry word change operation detection means. Alternatively, the entry word change processing may be executed repeatedly when the user keeps the coordinate set input instruction for a predetermined time period after such a slide operation is detected. Still alternatively, it may be determined whether or not the long push operation has been performed after the entry word change operation is detected by the entry word change operation detection means, and the entry word change processing may be executed repeatedly only when it is determined that the long push operation has been performed.

In a fourteenth aspect of the present invention based on the thirteenth aspect, the entry word data includes the plurality of entry words which are sequentially ordered from a first entry word to a final entry word. The entry word change operation detection means detects a direction of the slide operation when the slide operation is performed by the predetermined distance or longer in the entry word candidate display area. During entry word change processing executed repeatedly, (a) when a direction from an input coordinate set when the coordinate set input instruction is started by the user to an input coordinate set represented by an output signal from the coordinate set input means is a first direction, the second display control means erases at least an entry word displayed at a most forward position in the entry word candidate display area, and displays a new entry word subsequent to an entry word displayed at a most rearward position in the entry word candidate display area; and (b) when the direction from an input coordinate set when the coordinate set input instruction is started by the user to an input coordinate set represented by an output signal from the coordinate set input means is a second direction opposite to the first direction, the second display control means erases at least an entry word displayed at the most rearward position in the entry word candidate display area, and displays a new entry word preceding an entry word displayed at the most forward position in the entry word candidate display area.

In a fifteenth aspect of the present invention based on the second aspect, the entry word data includes the plurality of entry words which are sequentially ordered from a first entry word to a final entry word. The first display control means assigns the entry words included in the entry word data to virtual book pages, displays an entry word assigned to an N'th page (where N is an integer equal to or greater than 3) in a first sub area of the entry word candidate display area, and displays an entry word assigned to an (N+1)'th page in a second sub area of the entry word candidate display area. The entry word change operation detection means detects a direction of the slide operation when the slide operation is performed by the predetermined distance or longer in the entry word candidate display area. (a) When the direction of the slide operation detected by the entry word change operation detection means is a direction from the second sub area to the first sub area, the second display control means replaces the entry word displayed in the first sub area with an entry word assigned to an (N+2)'th page and replaces the entry word displayed in the second sub area with an entry word assigned to an (N+3)'th page; and (b) when the direction of the slide operation detected by the entry word change operation detection means is a direction from the first sub area to the second sub area, the second display control means replaces the entry word displayed in the first sub area with an entry word assigned to an (N−2)'th page and replaces the entry word displayed in the second sub area with an entry word assigned to an (N−1)'th page.

In a sixteenth aspect of the present invention based on the third aspect, the entry word data includes the plurality of entry words which are sequentially ordered from a first entry word to a final entry word. When the long push operation is performed for the predetermined time period or longer in the entry word candidate display area, the entry word change operation detection means detects which of the first sub area and the second sub area of the entry word candidate display area is represented by the input coordinate set from the coordinate set input means. (a) When the input coordinate set from the coordinate set input means represents the second sub area, the second display control means erases at least an entry word displayed at a most forward position in the entry word candidate display area, and displays a new entry word subsequent to an entry word displayed at a most rearward position in the entry word candidate display area; and (b) when the input coordinate set from the coordinate set input means represents the first sub area, the second display control means erases at least an entry word displayed at the most rearward position in the entry word candidate display area, and displays a new entry word preceding an entry word displayed at the most forward position in the entry word candidate display area.

In a seventeenth aspect of the present invention based on the sixteenth first aspect, when the slide operation is performed by the predetermined distance or longer in the entry word candidate display area, the entry word change operation detection means detects the slide operation as the entry word change operation by the user. The second display control means does not execute entry word change processing depending on which of the first sub area and the second sub area of the entry word candidate display area is represented by the input coordinate set from the coordinate set input means, while the user keeps the coordinate set input instruction after the slide operation by the predetermined distance or longer is detected by the entry word change operation detection means.

In an eighteenth aspect of the present invention based on the third aspect, the second display control means executes entry word change processing repeatedly while the user keeps the coordinate set input instruction after the long push operation for the predetermined time period is detected by the entry word change operation detection means.

In a variation of the eighteenth aspect, it may be determined whether or not the long push operation has been performed after the entry word change operation is detected by the entry word change operation detection means, and the entry word change processing may be executed repeatedly only when it is determined that the long push operation has been performed.

In a nineteenth aspect of the present invention based on the eighteenth aspect, the entry word data includes the plurality of entry words which are sequentially ordered from a first entry word to a final entry word. When the long push operation is performed for the predetermined time period or longer in the entry word candidate display area, the entry word change operation detection means detects which of the first sub area and the second sub area of the entry word candidate display area is represented by the input coordinate set from the coordinate set input means. During entry word change processing executed repeatedly, (a) when the input coordinate set from the coordinate set input means currently represents the second sub area, the second display control means erases at least an entry word displayed at a most forward position in the entry word candidate display area, and displays a new entry word subsequent to an entry word displayed at a most rearward position in the entry word candidate display area; and (b) when the input coordinate set from the coordinate set input means currently represents the first sub area, the second display control means erases at least an entry word displayed at the most rearward position in the entry word candidate display area, and displays a new entry word preceding an entry word displayed at the most forward position in the entry word candidate display area.

In a twentieth aspect of the present invention based on the third aspect, the entry word data includes the plurality of entry words which are sequentially ordered from a first entry word to a final entry word. The first display control means assigns the entry words included in the entry word data to virtual book pages, displays an entry word assigned to an N'th page (where N is an integer equal to or greater than 3) in a first sub area of the entry word candidate display area, and displays an entry word assigned to an (N+1)'th page in a second sub area of the entry word candidate display area. When the long push operation is performed for the predetermined time period or longer in the entry word candidate display area, the entry word change operation detection means detects which of the first sub area and the second sub area of the entry word candidate display area is represented by the input coordinate set from the coordinate set input means. (a) When the input coordinate set from the coordinate set input means represents the second sub area, the second display control means replaces the entry word displayed in the first sub area with an entry word assigned to an (N+2)'th page and replaces the entry word displayed in the second sub area with an entry word assigned to an (N+3)'th page; and (b) when the input coordinate set from the coordinate set input means represents the first sub area, the second display control means replaces the entry word displayed in the first sub area with an entry word assigned to an (N−2)'th page and replaces the entry word displayed in the second sub area with an entry word assigned to an (N−1)'th page.

In a twenty-first aspect of the present invention based on the fourth aspect, the entry word data includes the plurality of entry words which are sequentially ordered from a first entry word to a final entry word. When the slide operation is performed by the predetermined distance or longer in the entry word candidate display area, the entry word change operation detection means detects a direction of the slide operation; and when the long push operation is performed for the predetermined time period or longer in the entry word candidate display area, the entry word change operation detection means detects which of a first sub area and a second sub area of the entry word candidate display area is represented by the input coordinate set from the coordinate set input means. (a) While the user keeps the coordinate set input instruction after the slide operation by the predetermined distance or longer is detected by the entry word change operation detection means, the second display control means changes an entry word in accordance with a direction from an input coordinate set when the coordinate set input instruction is started by the user to an input coordinate set represented by an output signal from the coordinate set input means; and (b) while the user keeps the coordinate set input instruction after the long push operation for the predetermined time period or longer is detected by the entry word change operation detection means, the second display control means changes an entry word in accordance with which of the first sub area and the second sub area is currently represented by an input coordinate set from the coordinate set input means.

A twenty-second aspect of the present invention is directed to an information processing apparatus comprising display means (11, 12), coordinate set input means (15), entry word data storage means (24, 52), explanation data storage means (24, 53), first display control means (21, S18), entry word change operation detection means (21, S38, S54), second display control means (S21, S84, S96), and third display control means (21, S72). The coordinate set input means is for inputting a coordinate set input instruction from a user. The entry word data storage means is for storing entry word data including a plurality of entry words. The explanation data storage means is for storing explanation data associated with each of the plurality of entry words. The first display control means is for displaying, in an entry word candidate display area, a part of the plurality of entry words included in the entry word data. The entry word change operation detection means is for determining at least one of (a) whether or not a slide operation has been performed in the entry word candidate display area and (b) whether or not a long push operation has been performed in the entry word candidate display area, based on an output signal from the coordinate set input means, and detecting an entry word change operation by the user based on the determination result. The second display control means is for, when the entry word change operation by the user is detected by the entry word change operation detection means, erasing at least one entry word displayed in the entry word candidate display area and displaying a new entry word. The third display control means is for, when the coordinate set input instruction is terminated on an entry word displayed in the entry word candidate display area based on an output signal from the coordinate set input means, reading explanation data corresponding to the entry word and displaying an explanation of the entry word on the display means under a condition that no new entry word has been displayed by the second display control means at least in a time period from a start of the coordinate set input instruction until a termination thereof.

According to the first aspect, an instruction to switch the entry words displayed on the screen and an instruction to select an entry word displayed on the screen and display a meaning thereof can be input in the same entry word candidate display area. This improves the operability.

According to the second aspect, the user can distinguishably input an instruction to select an entry word and an instruction to change the entry word by performing the slide operation by the predetermined distance or longer. In addition, the user can quickly change the entry word displayed in the entry word candidate display area by performing the slide operation by the predetermined distance or longer.

According to the third aspect, the user can distinguishably input an instruction to select an entry word and an instruction to change the entry word by performing the long push operation for the predetermined time period or longer.

According to the fourth aspect, the user can distinguishably input an instruction to select an entry word and an instruction to change the entry word by performing the slide operation by the predetermined distance or longer or the long push operation for the predetermined time period or longer. An instruction to change the entry word can be input by either one of two different operations, which improves the convenience.

According to the eighth aspect, the user can search for a desired entry word by an intuitive operation as if he/she was turning a page of an actual book.

According to the ninth aspect, an entry word matching the text data and an entry word subsequent to that entry word are displayed in the entry word candidate display area, based on the text data input by the user. Therefore, the user can quickly display a desired entry word in the entry word candidate display area.

According to the tenth aspect, the entry word is changed repeatedly by the user continuing the long push operation. Therefore, even for changing the entry word a plurality of times, it is not necessary to perform the long push operation each time. This improves the operability.

According to the twelfth aspect, in accordance with the direction of the slide operation, the entry word is changed into the entry word ordered before the entry words currently displayed or into the entry word ordered after the entry words currently displayed. Therefore, a desired entry word can be displayed more quickly. Even if the slide operation is inadvertently performed, the entry word before the inadvertent slide operation can be displayed quickly by performing the slide operation in the opposite direction. This improves the operability.

According to the thirteenth aspect, the entry word is changed repeatedly by the user continuing the coordinate set input instruction after the slide operation. Therefore, even for changing the entry word a plurality of times, it is not necessary to perform the slide operation each time. This improves the operability.

According to the fourteenth aspect, the direction in which the entry words are shifted (i.e., whether the entry words ordered before the entry words currently displayed are to be displayed or the entry words ordered after the entry words currently displayed are to be displayed) can be changed when necessary by changing the input coordinate set while the coordinate set input instruction is continued. This improves the convenience.

According to the fifteenth aspect, the user can search for a desired entry word by an intuitive operation as if he/she was turning a page of an actual book.

According to the sixteenth aspect, in accordance with the position at which the long push operation is performed, the entry words are changed into the entry words ordered before the entry words currently displayed or into the entry words ordered after the entry words currently displayed. Therefore, a desired entry word can be displayed more quickly. Even if the slide operation is inadvertently performed, the entry words before the inadvertent slide operation can be displayed quickly by performing the long push operation at a different position. This improves the operability.

According to the eighteenth aspect, the entry word is changed repeatedly by the user continuing the long push operation. Therefore, even for changing the entry word a plurality of times, it is not necessary to perform the long push operation each time. This improves the operability.

According to the nineteenth aspect, the direction in which the entry words are shifted (i.e., whether the entry words ordered before the entry words currently displayed are to be displayed or the entry words ordered after the entry words currently displayed are to be displayed) can be changed when necessary by changing the input coordinate set while the coordinate set input instruction is continued. This improves the convenience.

According to the twentieth aspect, the user can search for a desired entry word by an intuitive operation as if he/she was turning a page of an actual book.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 shows an example of entry word data 52;

FIG. 15 shows an example of explanation data 53;

FIG. 17 shows the correspondence between the entry data and pages;

DESCRIPTION OF THE PREFERRED EMBODIMENTS

A structure and an operation of a game apparatus according to one embodiment of the present invention will be described. Herein, an example in which the present invention is applied to a game apparatus will be described, but the present invention is applicable to any information processing system.

Figure 1:
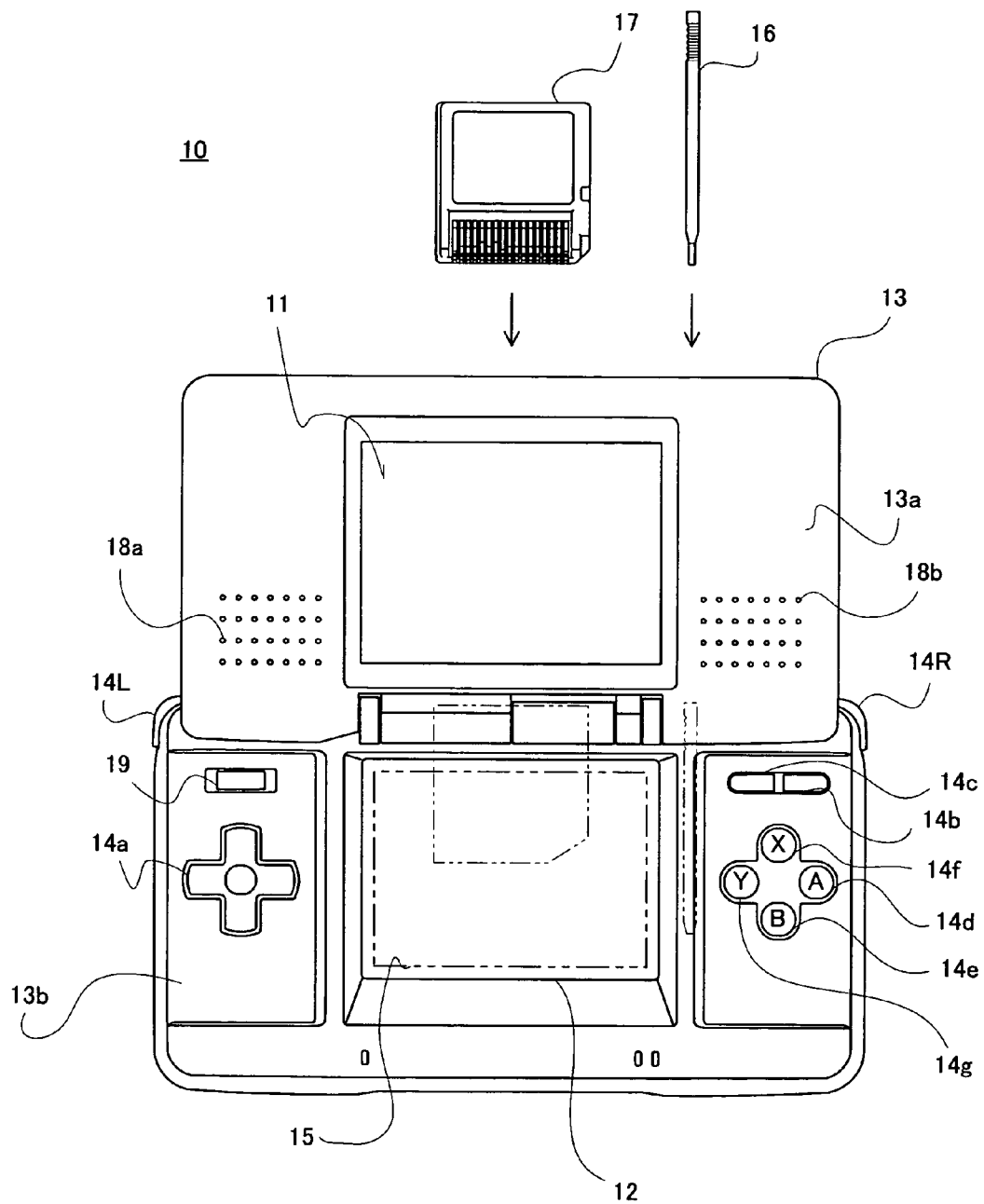
FIG. 1 is an external view of a game apparatus 10 according to one embodiment of the present invention.

FIG. 1 is an external view of a game apparatus according to one embodiment of the present invention. In FIG. 1, a game apparatus 10 includes a first LCD (Liquid Crystal Display) 11 and a second LCD 12. A housing 13 includes an upper housing 13a and a lower housing 13b. The first LCD is accommodated in the upper housing 13a, and the second LCD is accommodated in the lower housing 13b. The first LCD 11 and the second LCD 12 both have a resolution of 256 dots× 192 dots. In this embodiment, LCDs are used as display devices, but the present invention is applicable to apparatuses using other arbitrary display devices such as EL (Electro Luminescence) devices or the like. The display devices may have any resolution.

The upper housing 13a has speaker holes 18a and 18b for releasing a sound from a pair of speakers (represented with reference numerals 30a and 30b in FIG. 2) described later.

The lower housing 13b has a cross-shaped switch 14a, a start switch 14b, a select switch 14c, an A button 14d, a B button 14e, an X button 14f, a Y button 14g, an L button 14L and an R button 14R provided thereon as input elements. A touch panel 15 is attached to a screen of the second LCD 12 as an additional input element. The lower housing 13b has a power switch 19 and insertion holes for accommodating a memory card 17 and a stick 16.

The touch panel 15 may be of any system; for example, a resistance film system, an optical (infrared) system, or a static capacitance coupling system. The touch panel 15 has a function of, when a surface thereof is touched with the stick 16, outputting coordinate set data corresponding to the position of the surface touched by the stick 16. Hereinafter, the player operates the touch panel 15 using the stick 16. Alternatively, the player may operate the touch panel 15 using a pen (stylus pen) or his/her finger instead of the stick 16. In this embodiment, the touch panel 15 has a resolution of 256 dots×192 dots (detection precision) like the second LCD 12. It is not absolutely necessary that the touch panel 15 has the same resolution as that of the second LCD 12.

The memory card 17 is a storage medium having an electronic dictionary program stored thereon as an example of information processing programs, and is detachably attachable into the insertion hole of the lower housing 13b.

Next, with reference to FIG. 2, an internal structure of the game apparatus 10 will be described.

Figure 2:
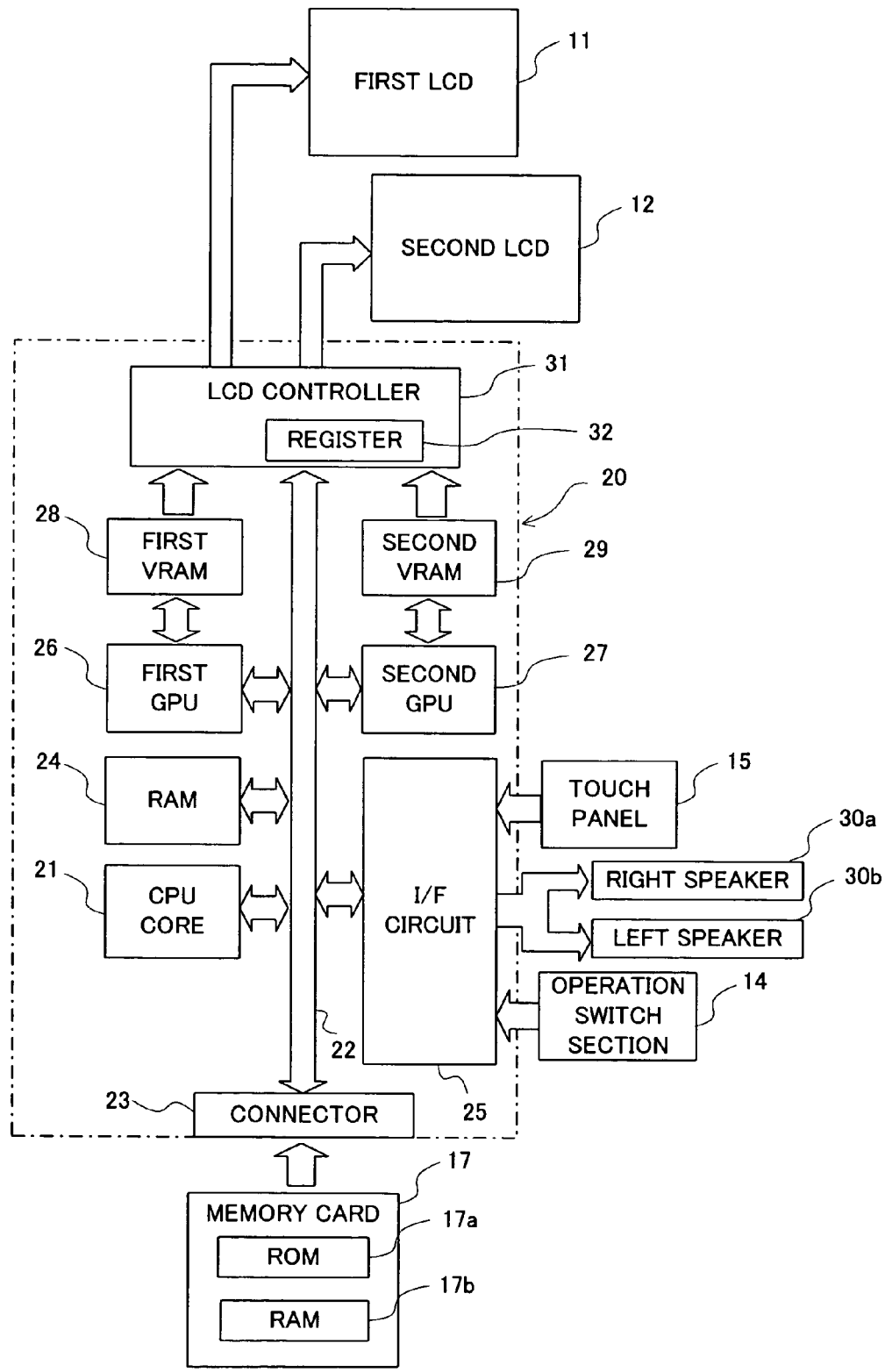
FIG. 2 is a block diagram showing an internal structure of the game apparatus 10.

In FIG. 2, a CPU core 21 is mounted on an electronic circuit board 20 accommodated in the housing 13. The CPU core 21 is connected to a connector 23 and is also connected to an input/output interface circuit (represented as "I/F circuit" in FIG. 2) 25, a first GPU (Graphics Processing Unit) 26, a second GPU 27, a RAM 24 and an LCD controller 31, via a bus 22. The memory card 17 is detachably connected to the connector 23. The memory card 17 includes a ROM 17a having an electronic dictionary program stored thereon and a RAM 17b having backup data rewritably stored thereon. The electronic dictionary program stored on the ROM 17a of the memory card 17 is loaded onto the RAM 24, and the electronic dictionary program loaded onto the RAM 24 is executed by the CPU core 21. The RAM 24 stores temporary data obtained by the execution of the electronic dictionary program by the CPU core 21 and data for generating display images, as well as the electronic dictionary program. The I/F circuit 25 is connected to the touch panel 15, a right speaker 30a, a left speaker 30b, and an operation switch section 14 including the cross switch 14a, the A button 14d and the like shown in FIG. 1. The right speaker 30a and the left speaker 30b are respectively located inside the speaker holes 18a and 18b.

The first GPU 26 is connected to a first VRAM (Video RAM) 28, and the second GPU 27 is connected to a second VRAM 29. In response to an instruction from the CPU core 21, the first GPU 26 generates a first display image based on the image data stored on the RAM 24, and draws the first display image in the first VRAM 28. Similarly, in response to an instruction from the CPU core 21, the second GPU 27 generates a second display image and draws the second display image in the second VRAM 29. The first VRAM 28 and the second VRAM 29 are connected to the LCD controller 31.

The LCD controller 31 includes a register 32. The register 32 stores the value of "0" or "1" in accordance with an instruction from the CPU core 21. When the value in the register 32 is "0", the LCD controller 31 outputs the first display image drawn in the first VRAM 28 to the first LCD 11, and outputs the second display image drawn in the second VRAM 29 to the second LCD 12. When the value in the register 32 is "1", the LCD controller 31 outputs the first display image drawn in the first VRAM 28 to the second LCD 12, and outputs the second display image drawn in the second VRAM 29 to the first LCD 11.

The above-described structure of the game apparatus 10 is merely exemplary. The present invention is applicable to any information processing apparatus including at least one display screen and coordinate set input means for indicating a position on the display screen. An information processing program according to the present invention may be supplied to an information processing system via an external storage medium such as the memory card 17 or the like, or via a wired or wireless communication line. The information processing program may be pre-stored on a non-volatile storage device in the information processing system.

An overview of an electronic dictionary realized by an electronic dictionary program according to the present invention will be described by way of drawings.

Figure 3:
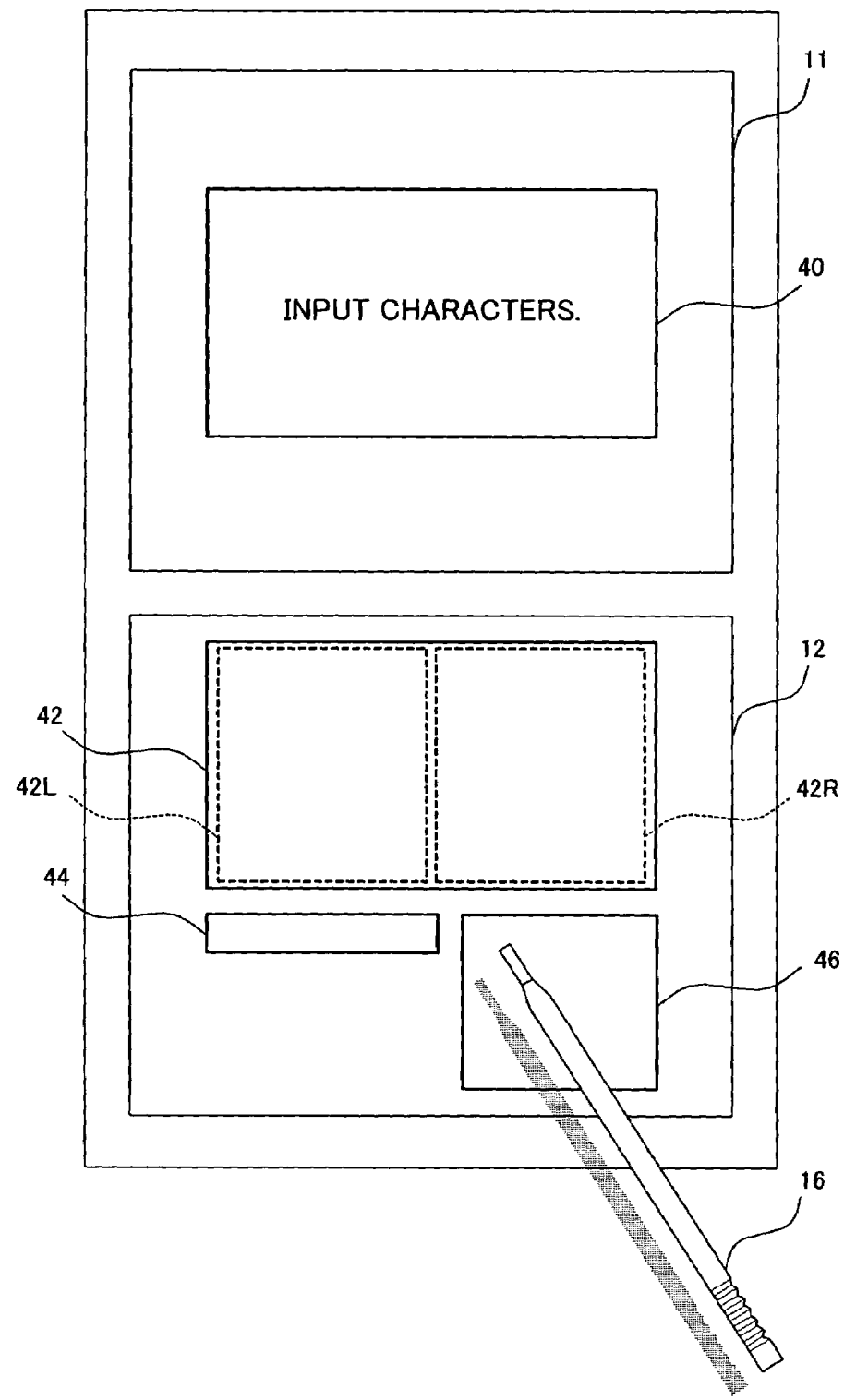
FIG. 3 shows an example of an initial screen.

FIG. 3 shows an initial screen immediately after execution of the electronic dictionary program is started.

On the first LCD 11, an explanation sentence display area 40 is displayed. In the explanation sentence display area 40, an explanation of an entry word described below, a message to a user or the like is displayed. The message to the user does not need to be displayed.

On the second LCD 12, an entry word candidate display area 42, a test box 44, and a handwriting input area 46 are displayed. In the entry word candidate display area 42, five entry words in a left page area 42L and five entry words in a right page area 42R, i.e., 10 entry words in total, are displayed in accordance with a character string which is input to the text box 44. The text box 44 is an area for the user to input character strings. In order to input a character string to the text box 44, any method can be used such as, for example, inputting from the operation switch section 14 or use of a virtual keyboard displayed on the second LCD 12. In this embodiment, the user writes characters in the handwriting input area 46 with the stick 16 to input character strings to the text box 44.

Figure 4:
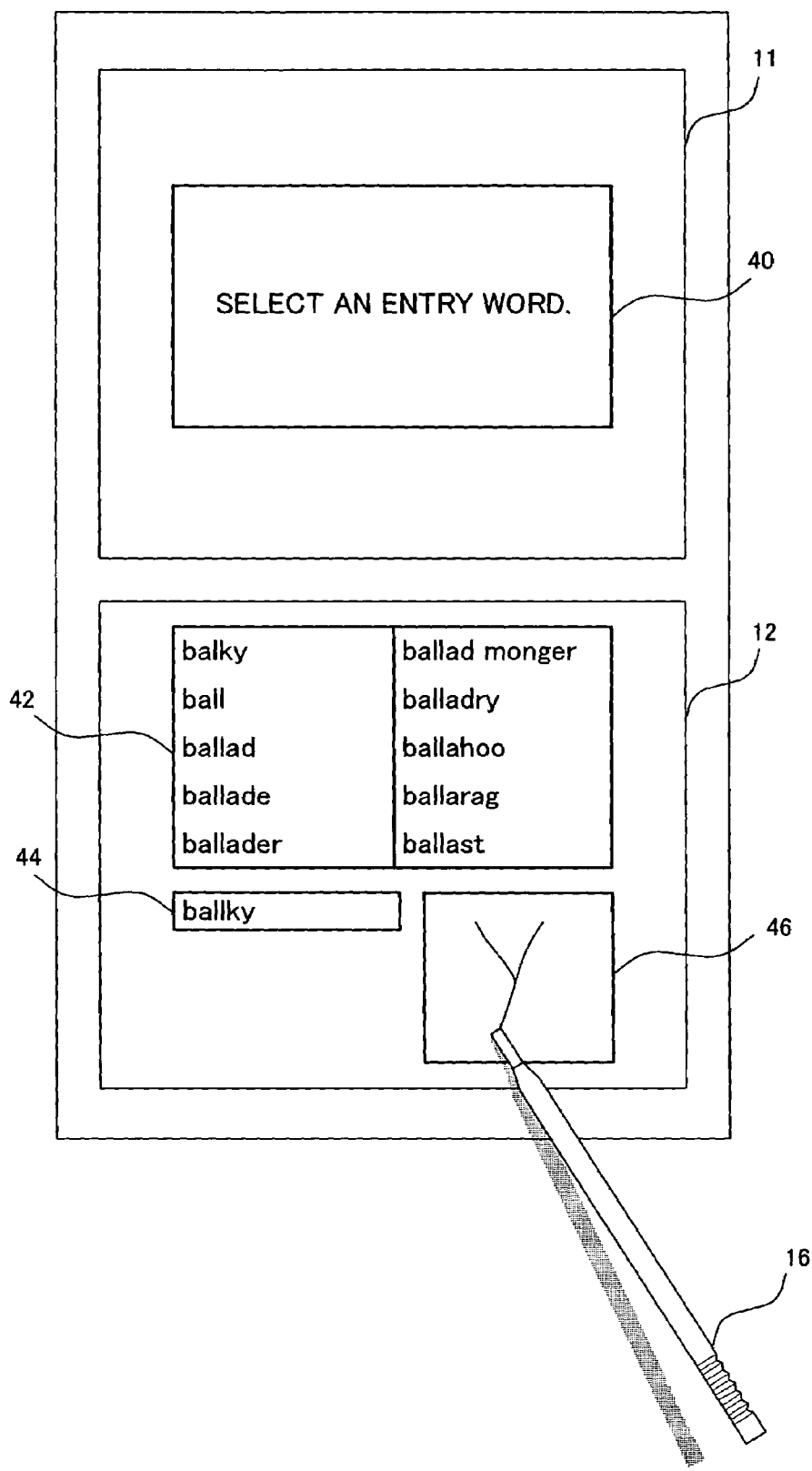
FIG. 4 shows an example of a display when characters are input to a text box 44.

FIG. 4 shows an example of a display when the user inputs a character string "balky" to the text box 44. When the user inputs a character string to the text box 44 like this, for example, ten entry words selected from a pre-provided list of entry words based on the input character string are displayed in the entry word candidate display area 42. The user taps a desired entry word among the entry words displayed in the entry word candidate display area 42 with the stick 16, and thus can display a meaning of the desired entry word in the explanation sentence display area 40. The word "tap" means to touch with the stick 16 or the like lightly and immediately takes the stick 16 or the like off from the screen.

Figure 5:
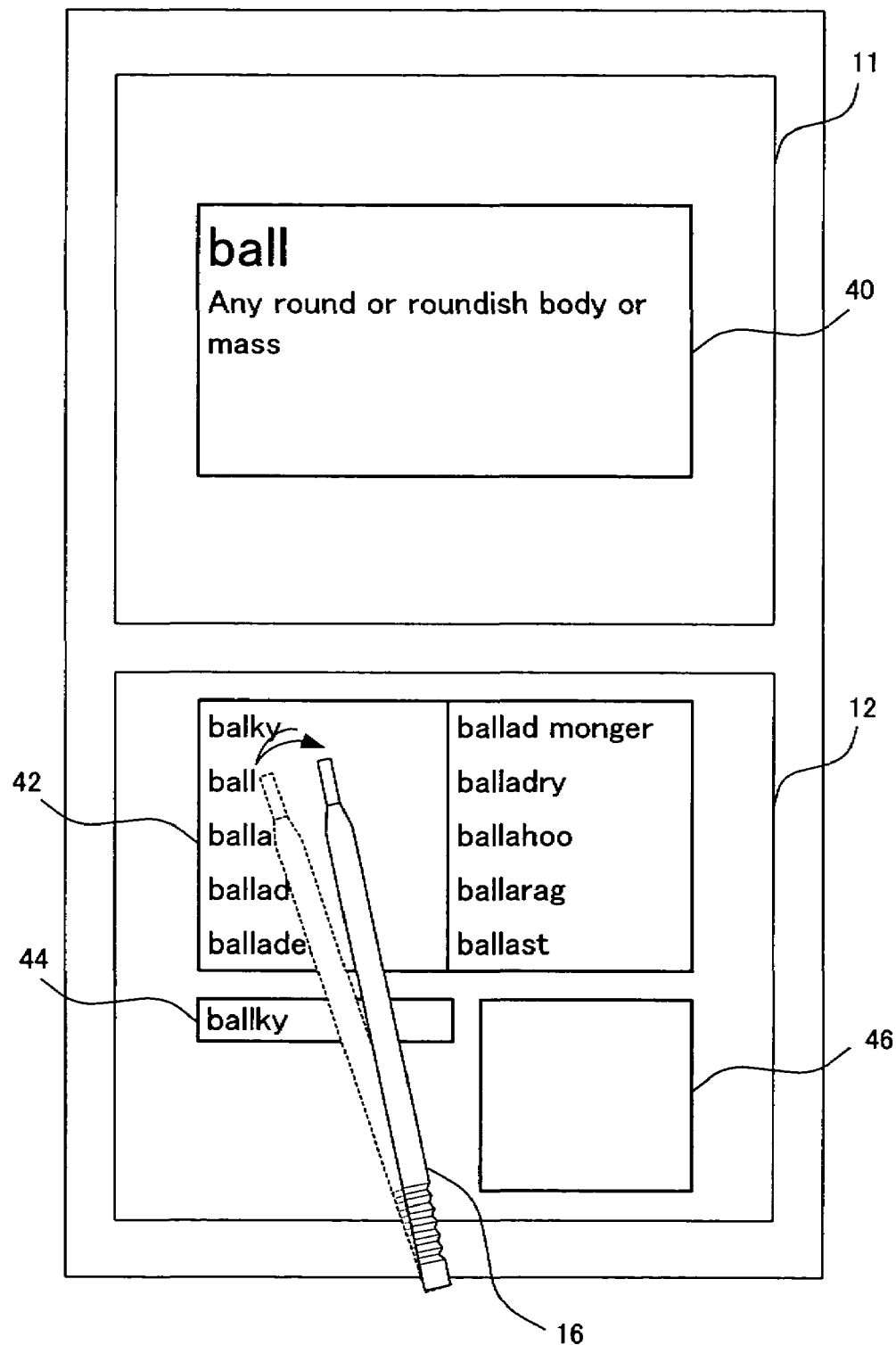
FIG. 5 shows an example of a display when an entry word is selected.

FIG. 5 shows an example of a display when the user taps an entry word "ball" with the stick 16 in the entry word candidate display area 42. In the explanation sentence display area 40, an explanation sentence of the entry word "ball" is displayed. When the user further taps another entry word, an explanation sentence of the second entry word is displayed in the explanation sentence display area 40.

When none of the entry words displayed in the entry word candidate display area 42 is the desired entry word, or when the user wishes to check the meaning of another entry word formed of a character string close to the desired entry word, the user can perform a predetermined entry word change operation to change entry words displayed in the entry word candidate display area 42 as if turning a page of an actual dictionary. As the entry word change operation, two operations of (i) a slide operation and (ii) a long push operation are prepared. The user can change entry words displayed in the entry word candidate display area 42 by one of the two operations which he/she prefers.

Figure 6:
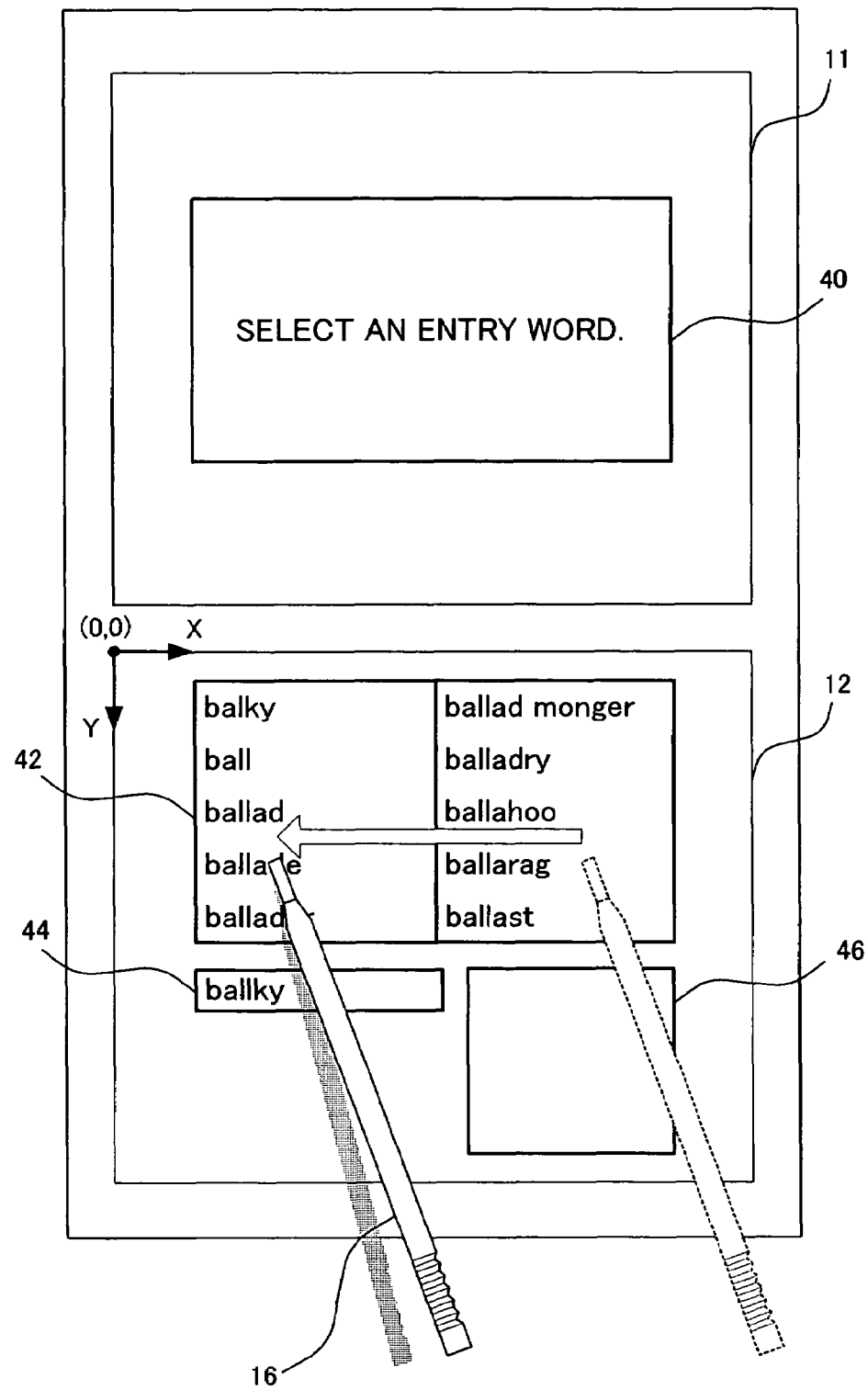
FIG. 6 shows an example of a leftward slide operation on the screen.
Figure 7:
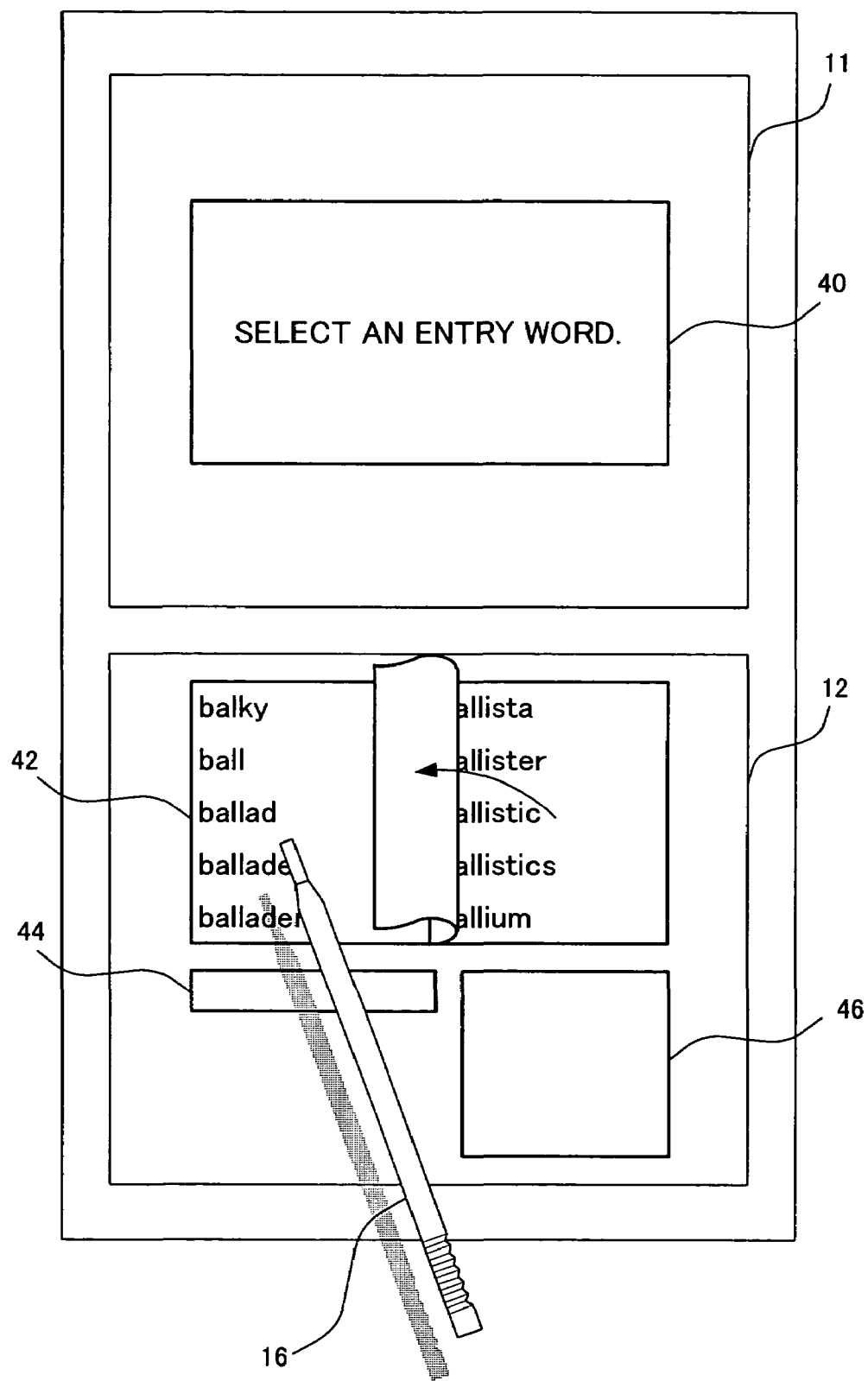
FIG. 7 shows an example of a display of a page being turned in accordance with the leftward slide operation on the screen.
Figure 8:
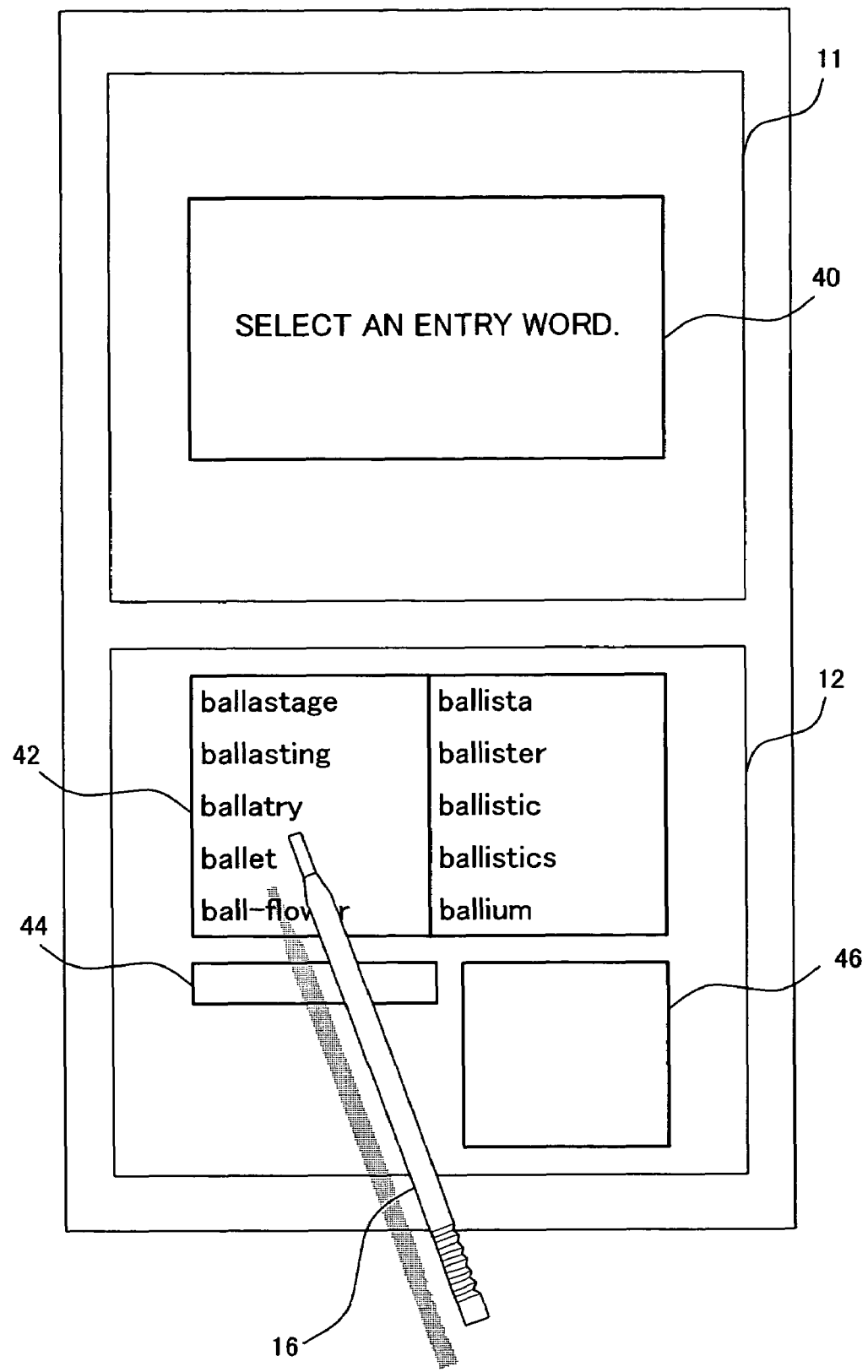
FIG. 8 shows an example of a display after the page is turned in accordance with the leftward slide operation on the screen.
Figure 9:
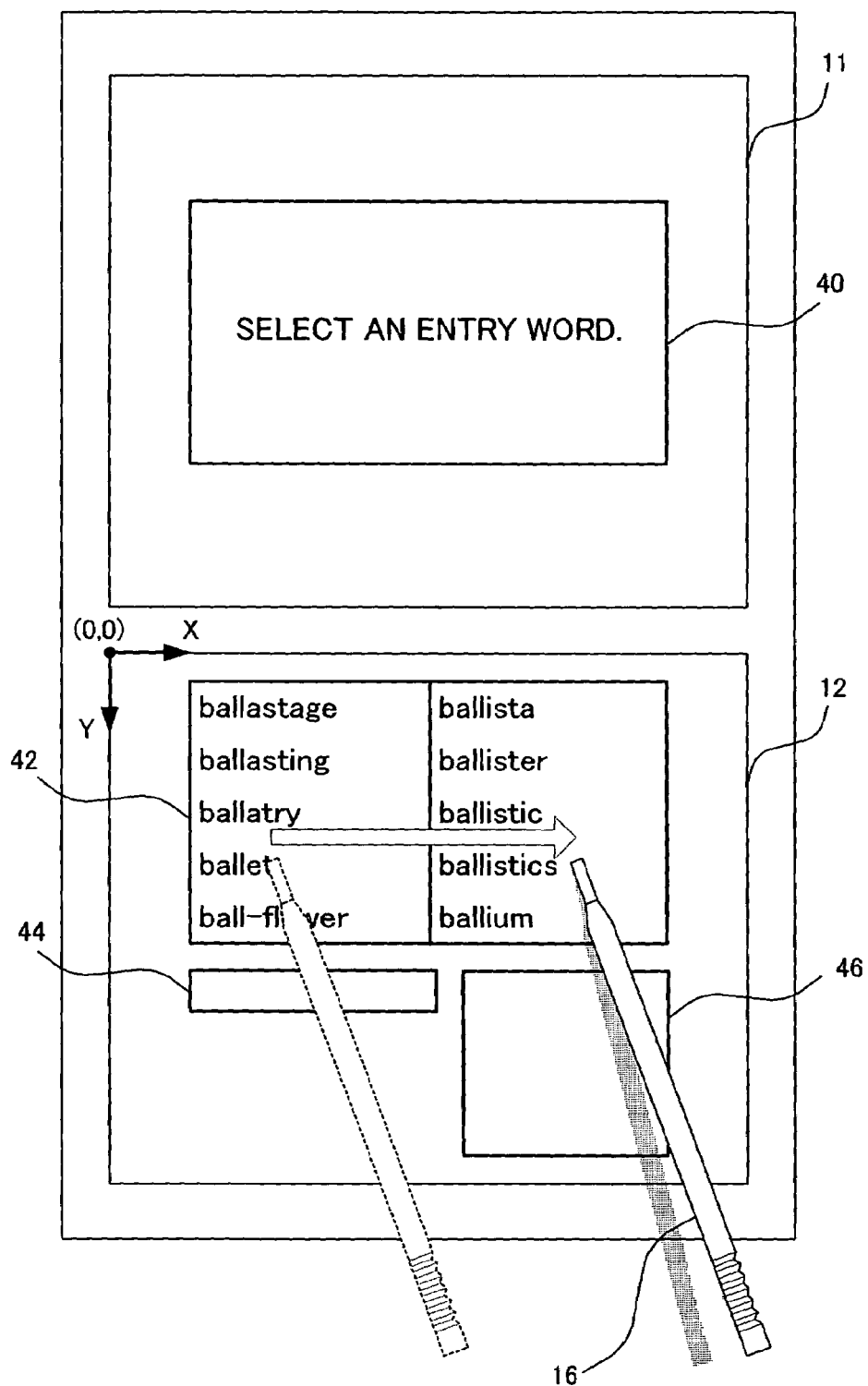
FIG. 9 shows an example of a rightward slide operation on the screen.
Figure 10:
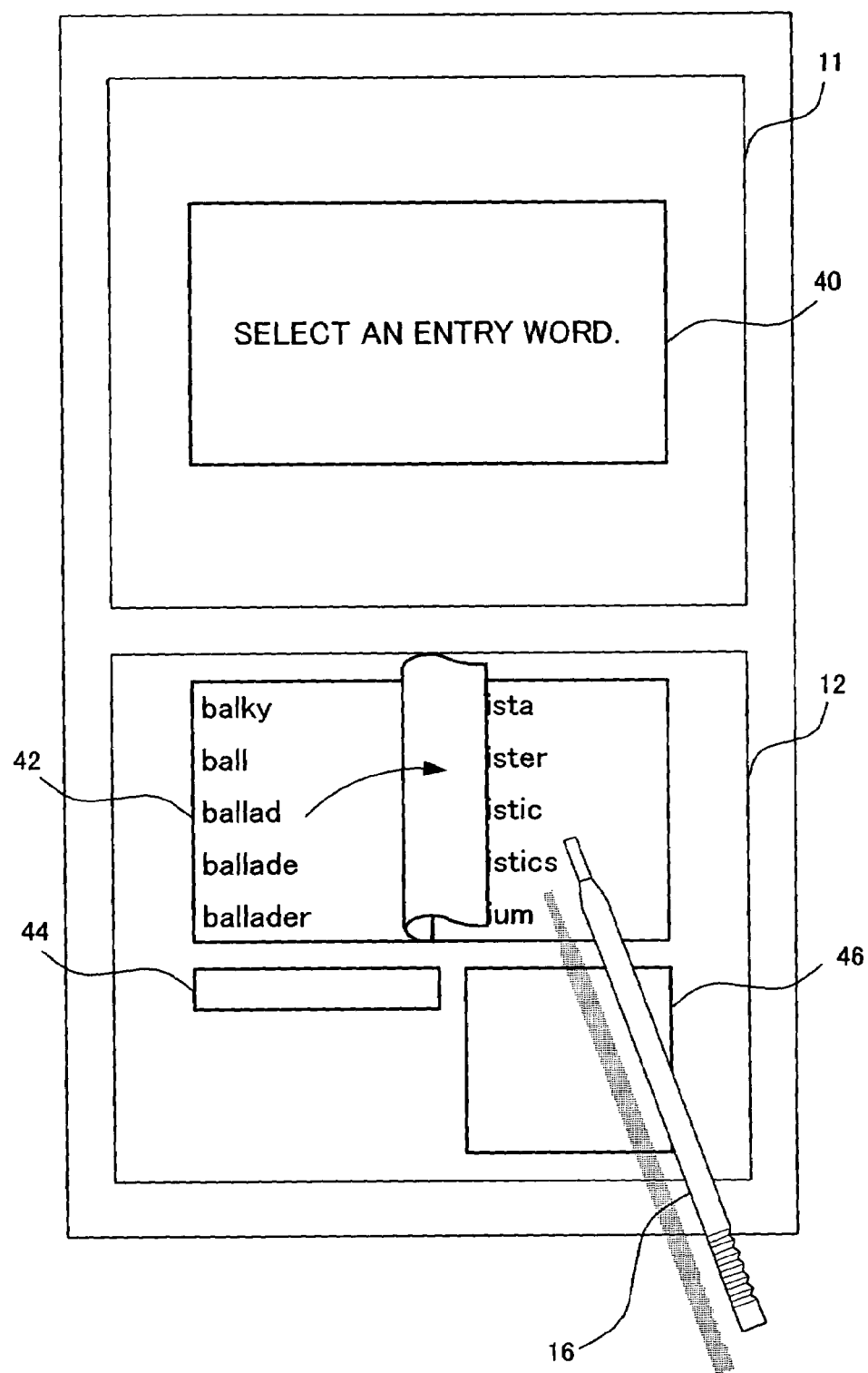
FIG. 10 shows an example of a display of a page being turned in accordance with the right ward slide operation on the screen.
Figure 11:
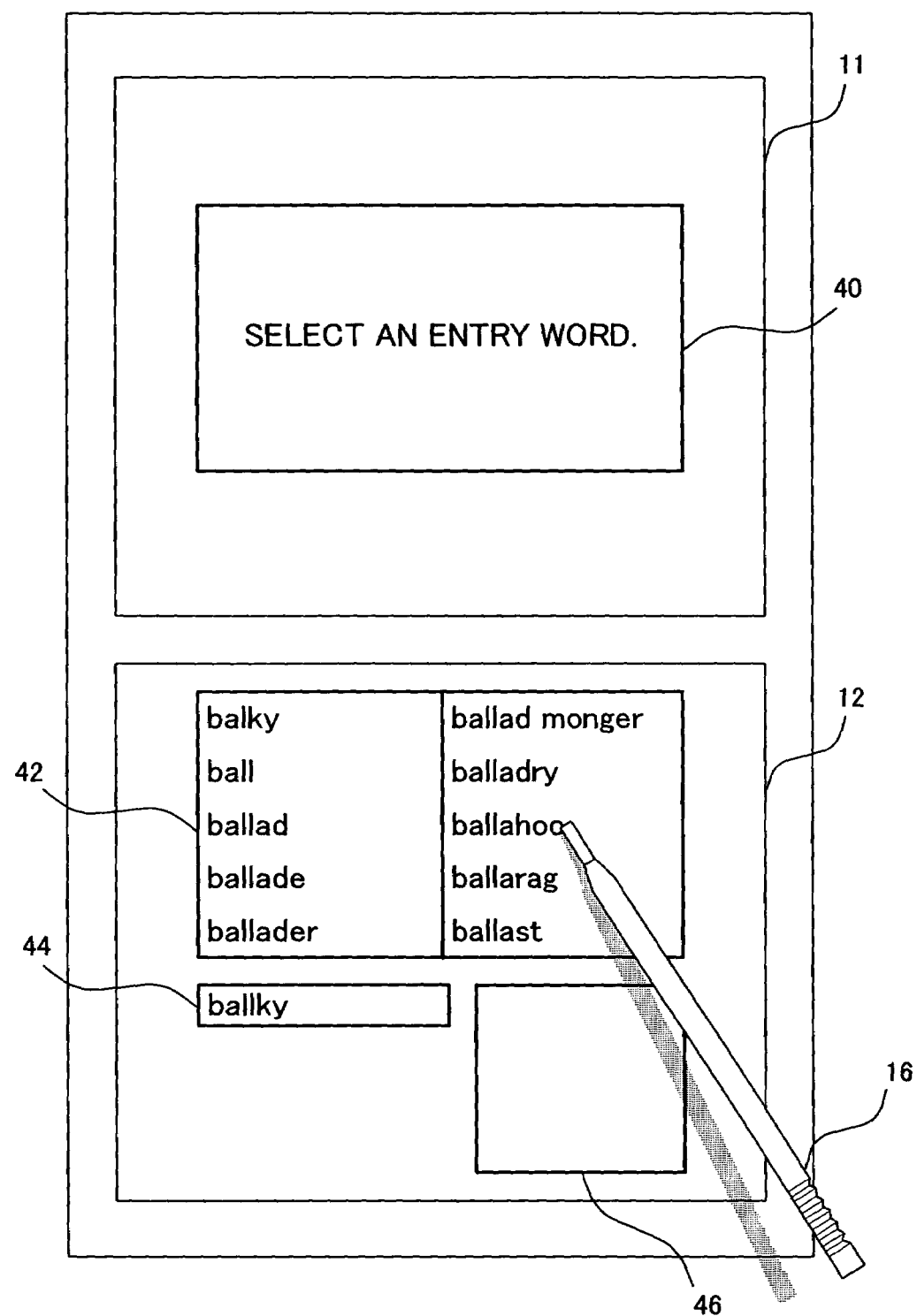
FIG. 11 shows an example of a display after the page is turned in accordance with the rightward slide operation on the screen.

FIG. 6 shows an example of the slide operation as one variation of the entry word change operation. By the slide operation, entry words can be changed by sliding the stick 16 in the entry word candidate display area 42. The term "slide" means to move the stick 16 while keeping the stick 16 in touch with the touch panel 15. When the slide operation is used, entry words to be newly displayed vary in accordance with the sliding direction. In the following description, the rightward direction on the second LCD is set as a positive X axis direction. For example, when the stick 16 is slid in a negative X axis direction in the entry word candidate display area 42 as shown in FIG. 6, an animation of the right page being turned is displayed as shown in FIG. 7. Then, as shown in FIG. 8, ten new entry words are displayed in the entry word candidate display area 42. By contrast, when the stick 16 is slid in the positive X axis direction in the entry word candidate display area 42 as shown in FIG. 9 from the state of FIG. 8, an animation of the left page being turned is displayed as shown in FIG. 10. Then, as shown in FIG. 11, the ten entry words initially displayed are displayed again in the entry word candidate display area 42. The direction in which the page is turned depends only on the sliding direction, and does not depend on the position at which the slide operation is started or terminated. Therefore, if the slide operation shown in FIG. 9 is performed only in the right page area 42R, the left page is turned rightward as shown in FIG. 10. Alternatively, the information processing program may be set such that only when the stick 16 is slid in the negative X axis direction in the right page area 42R, the right page is turned and such that only when the stick 16 is slid in the positive X axis direction in the left page area 42L, the left page is turned.

Figure 12:
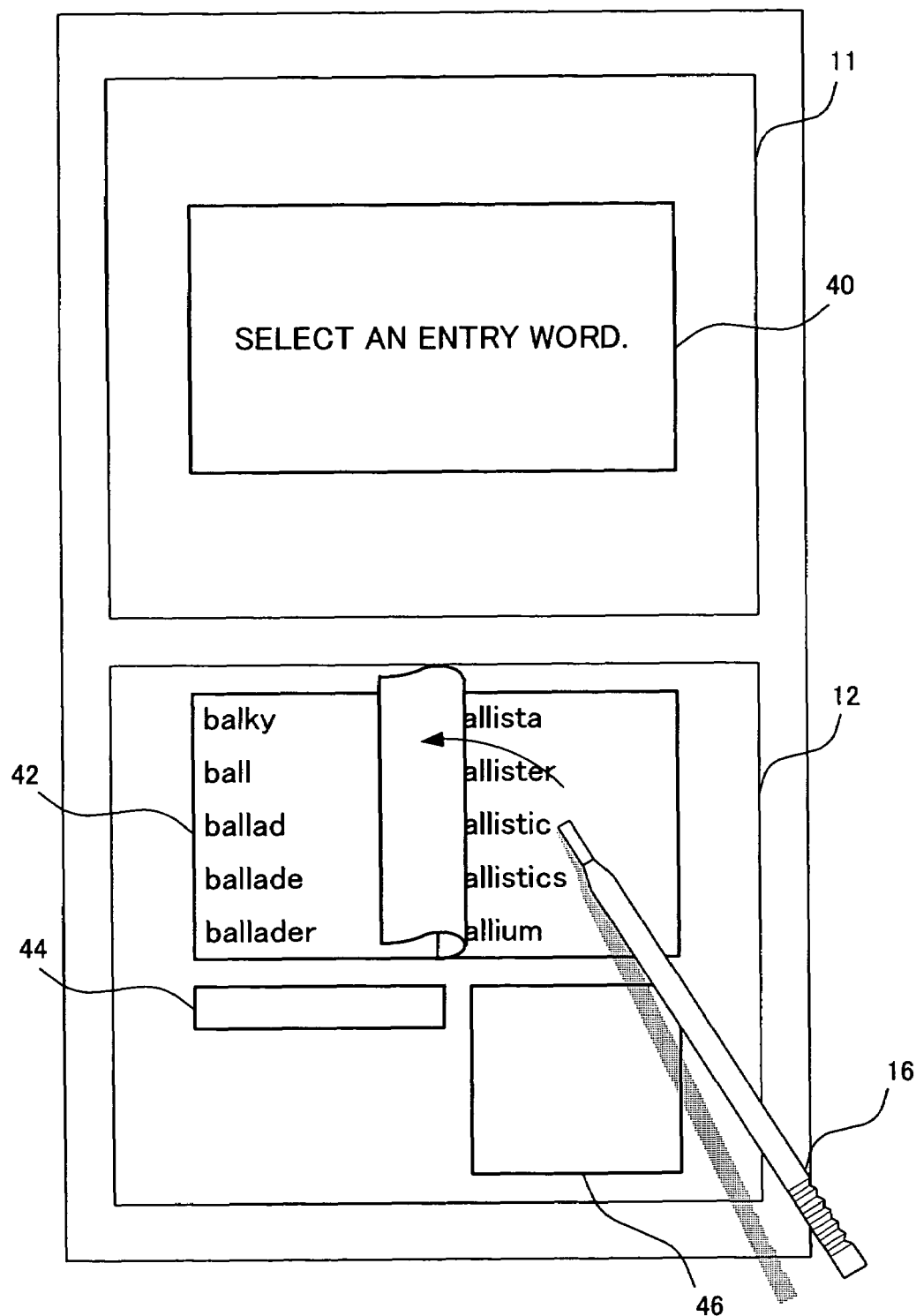
FIG. 12 shows an example of a display of a page being turned in accordance with a long push operation in a right page area 42R.

FIG. 12 shows an example of the long push operation as another variation of the entry word change operation. By the long push operation, entry words can be changed by long-pushing the entry word candidate display area 42 with the stick 16. The term "long push" means to keep the stick 16 in touch with the touch panel 15 for a certain period of time. When the long push operation is used, entry words to be newly displayed vary in accordance with the position of the entry word candidate display area 42 touched by the stick 16. For example, when the stick 16 long-pushes the right page area 42R as shown in FIG. 12, the right page is turned leftward as shown in FIG. 12. By contrast, when the stick 16 long-pushes the left page area 42L, the left page is turned rightward.

By keeping the stick 16 in touch with the touch panel 15 for a certain period of time without taking the stick 16 off from the touch panel 15 even after the page is turned by the slide operation or the long push operation described above, the user can turn pages repeatedly. For example, when, after the slide operation shown in FIG. 6, the user keeps the stick 16 in touch with the touch panel 15 at the position at which the slide operation was terminated without taking the stick 16 off from the touch panel 15, a plurality of pages are turned leftward consecutively. The pages stop being turned when the user takes the stick 16 off from the touch panel 15. Similarly, when, after the long push operation shown in FIG. 12, the user keeps the stick 16 in touch with the touch panel 15 at the same position, a plurality of pages are turned leftward consecutively. The pages stop being turned when the user takes the stick 16 off from the touch panel 15.

Next, an operation of the game apparatus 10 for realizing the above-described electronic dictionary will be described in detail.

Figure 13:
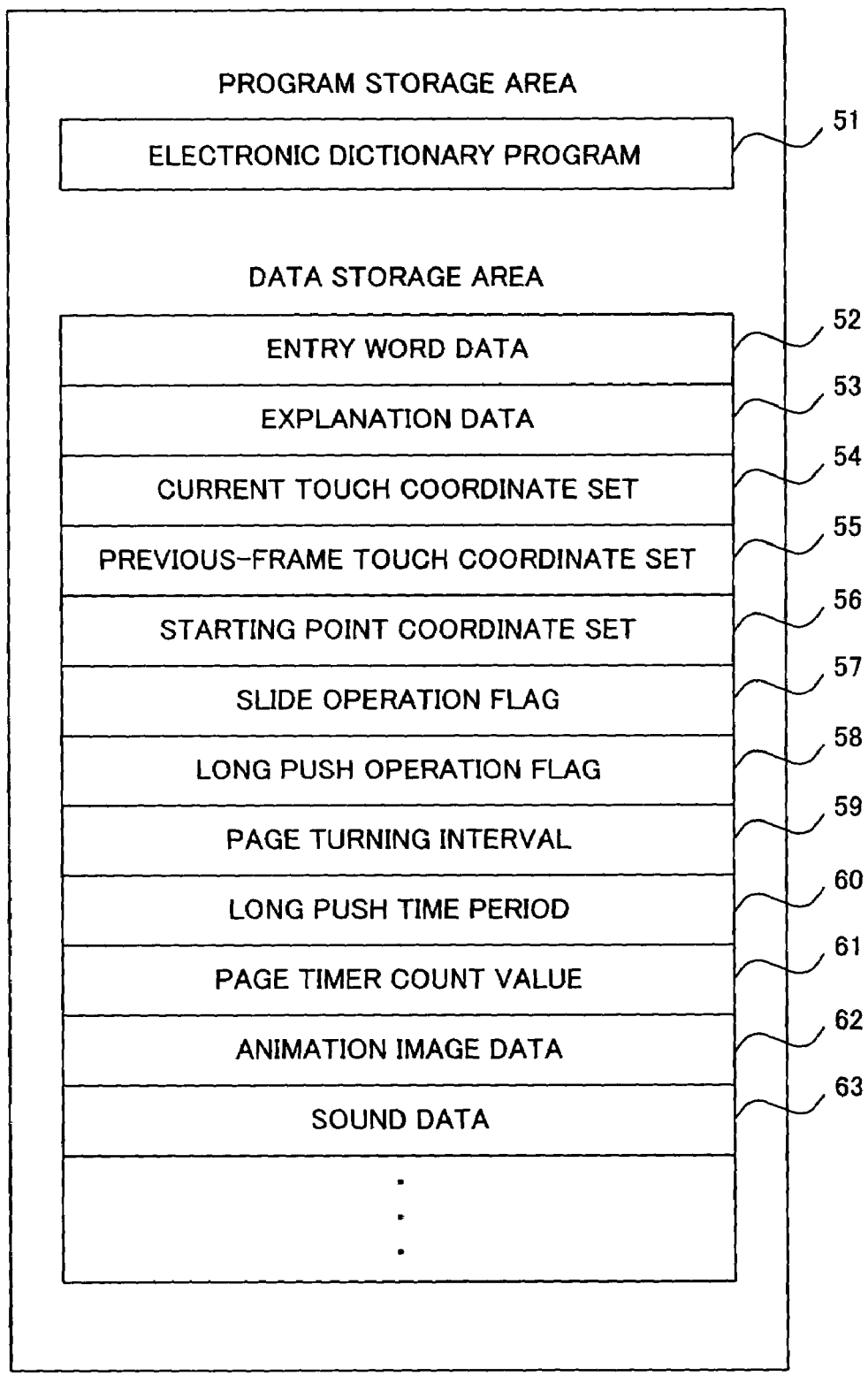
FIG. 13 is a memory map of a RAM 24.

FIG. 13 is a memory map of the RAM 24. The RAM 24 has stored thereon an electronic dictionary program 51, entry word data 52, explanation data 53, a current touch coordinate set 54, a previous-frame touch coordinate set 55, a starting point coordinate set 56, a slide operation flag 57, a long push operation flag 58, a page turning interval 59, a long push time period 60, a page timer count value 61, animation image data 62, and sound data 63.

The electronic dictionary program 51 is a program which sets the procedure of processing to be executed by the CPU core 21. Before the execution of the processing, the electronic dictionary program 51 is read from the ROM 17a into the RAM 24.

The entry word data 52 is information on all the entry words included in the electronic dictionary. FIG. 14 shows a specific example of the entry word data 52. In the entry word data 52, all the entry words are sequentially ordered from the first entry word "a" to the last entry word "zyrian".

The explanation data 53 is information on an explanation of each entry word included in the electronic dictionary. FIG. 15 shows a specific example of the explanation data 53.

The entry word data 52 and the explanation data 53 are read from the ROM 17a into the RAM 24 at an appropriate time and are referred to by the CPU core 21.

The current touch coordinate set 54 is a coordinate set representing a latest position of the touch panel 15 touched by the stick 16. The current touch coordinate set 54 is updated whenever necessary based on an output signal from the touch panel 15.

The previous-frame touch coordinate set 55 is a coordinate set representing a position of the touch panel 15 touched by the stick 16 in the immediately previous frame.

The starting point coordinate set 56 is a coordinate set representing a position of the touch panel 15 which was first touched by the stick 16 in the above-described slide operation.

The slide operation flag 57 is a flag indicating whether or not a page has already been turned by the slide operation.

The long push operation flag 58 is a flag indicating whether or not a page has already been turned by the long push operation.

The page turning interval 59 is a variable representing a time period after one page is turned until the next page is turned in a continued page turning mode.

The long push time period 60 is a variable representing a time period in which the stick 16 is kept in touch with the touch panel 15 (in this embodiment, more accurately, the time period in which the stick 16 stops or moves at a speed less than a predetermined speed on the touch panel 15).

The page timer count value 61 is a count value of a page timer for counting a time period in which one same page is kept displayed in the continued page turning mode.

The animation image data 62 is image data for displaying an animation as shown in FIG. 7 of a page being turned.

The sound data 63 is data for outputting a sound representing a page being turned, which is output from the game apparatus 10 along with the animation. The sound which is output when the right page is turned and the sound which is output when the left page is turned may be different. In this case, for example, the sound data when the right page is turned and the sound data when the left page is turned may be different. Thus, when pages are consecutively turned at high speed, the direction in which pages are turned can be found by the sound.

Next, with reference to FIG. 16 through FIG. 21, a flow of processing executed by the CPU core 21 based on the electronic dictionary program 51 will be described in detail. FIG. 16 and FIG. 18 through FIG. 21 area flowchart illustrating the processing, and FIG. 17 shows a specific example of the entry word data 52.

Figure 16:
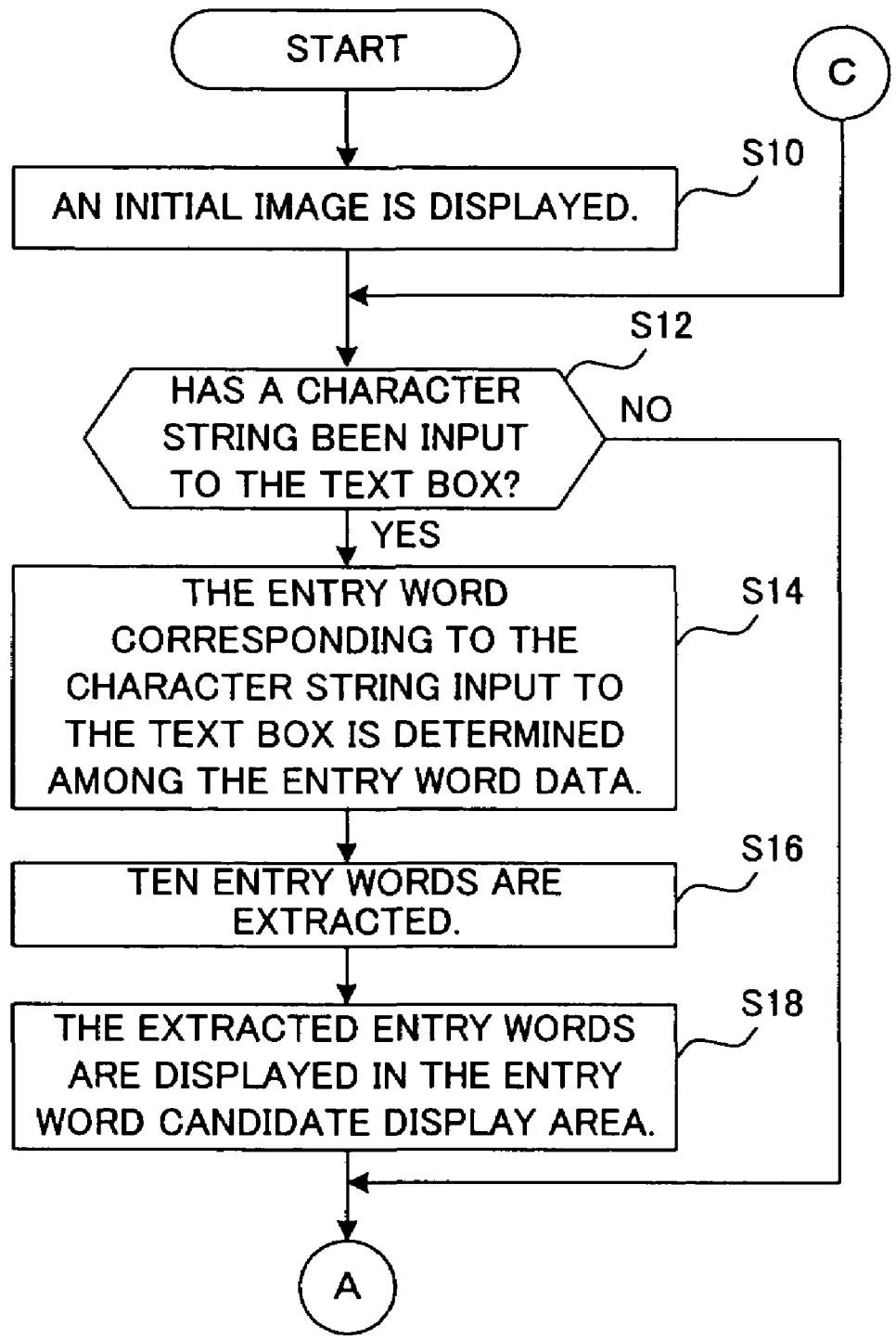
FIG. 16 shows a part of a flowchart illustrating a flow of processing based on an electronic dictionary program 51.

As shown in FIG. 16, when the execution of the electronic dictionary program 51 is started, in step S10, the CPU core 21 first displays an initial image as shown in FIG. 3 on the first LCD 11 and the second LCD 12.

In step S12, it is determined whether or not a character string has been input to the text box 44. When a character string has been input, the processing advances to step S14. When no character string has been input, the processing advances to step S20 in FIG. 18.

Instep S14, an entry word corresponding to the character string input to the text box 44 is determined from the entry words included in the entry word data 52. When none of the entry words included in the entry word data 52 matches the character string input to the text box 44, an entry word closest to the character string is determined as the entry word corresponding to the character string input to the text box 44. For example, in the case where a character string "ballado" has been input to the text box 44, "balladry" is selected from the entry word data 52 shown in FIG. 17 as the entry word corresponding to the character string "ballado".

In step S16, ten entry words which are continuously arranged in a descending order from the entry word corresponding to the character string input to the text box 44 are extracted. For example, in the case where the entry word corresponding to the character string input to the text box 44 is "balky" shown in FIG. 17, ten entry words which are ordered at the 196th position through the 205th position are extracted.

In step S18, the ten entry words extracted in step S16 are displayed in the entry word candidate display area 42. For example, the five entry words which are ordered at the 196th position through the 200th position are displayed in the left page area 42L, and the five entry words which are ordered at the 201st position through the 205th position are displayed in the right page area 42R.

Figure 18:
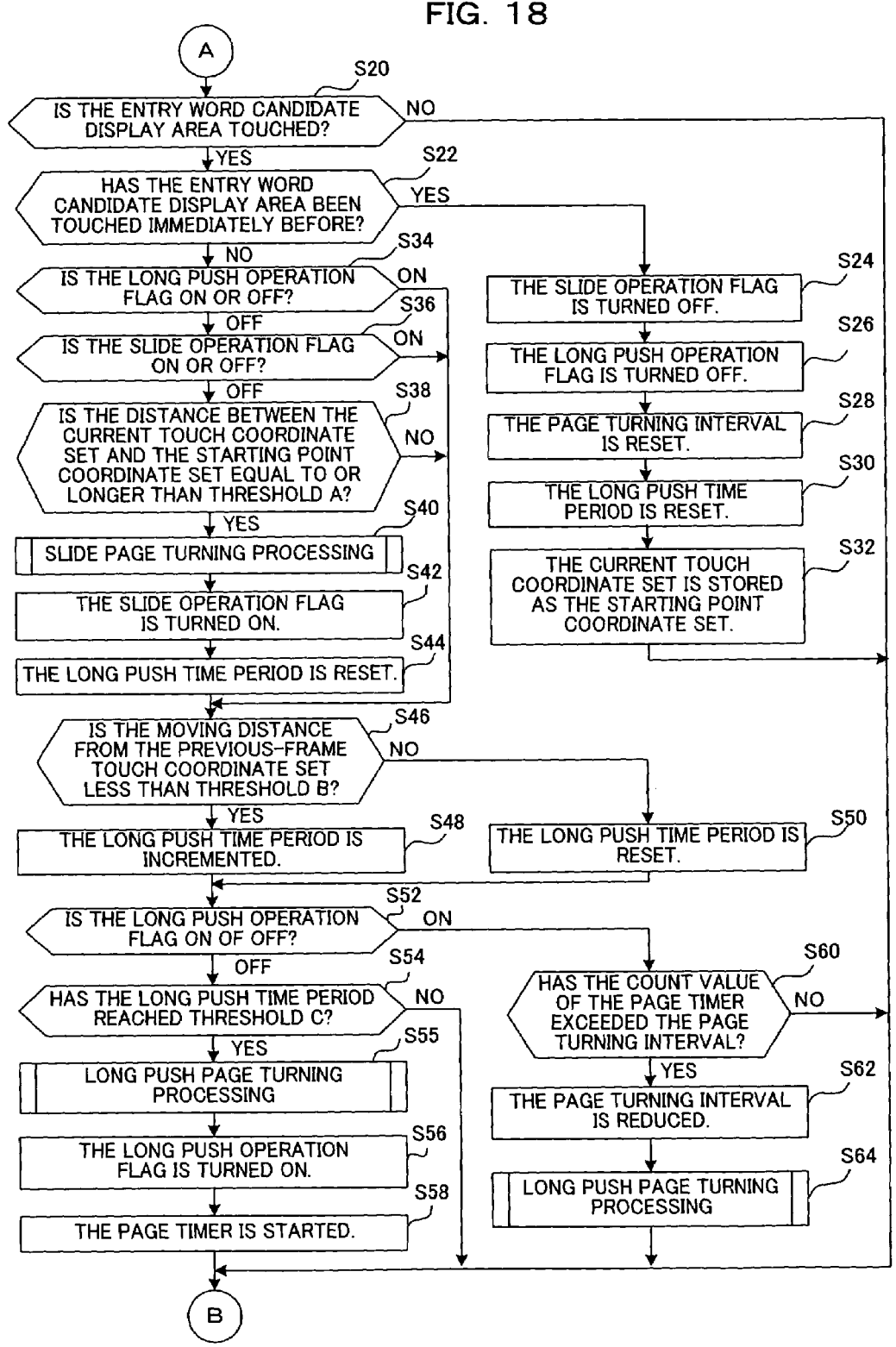
FIG. 18 shows a part of the flowchart illustrating the flow of processing based on the electronic dictionary program 51.

Referring to FIG. 18, in step S20, it is determined whether or not the stick 16 is in touch with the entry word candidate display area 42. When the stick 16 is in touch, the processing advances to step S22. When the stick 16 is not in touch, the processing advances to step S66 in FIG. 19. When no entry word is displayed in the entry word candidate display area 42, the processing advances to step S66.

In step S22, it is determined whether or not the stick 16 has touched the entry word candidate display area 42 immediately before. More specifically, when the stick 16 was not in touch with the touch panel 15 in the immediately previous frame and the stick 16 is in touch with the touch panel 15 in the current frame, it is determined that the stick 16 has touched the entry word candidate display area 42 immediately before. This determination can be made by, for example, referring to the previous-frame touch coordinate set 55. When the stick 16 has touched the entry word candidate display area 42 immediately before, the processing advances to step S24. Otherwise, the processing advances to step S34.

In step S24, the slide operation flag 57 is turned off.

In step S26, the long push operation flag 58 is turned off.

In step S28, the page turning interval 59 is reset to a predetermined initial value.

In step S30, the long push time period is reset to zero.

Figure 19:
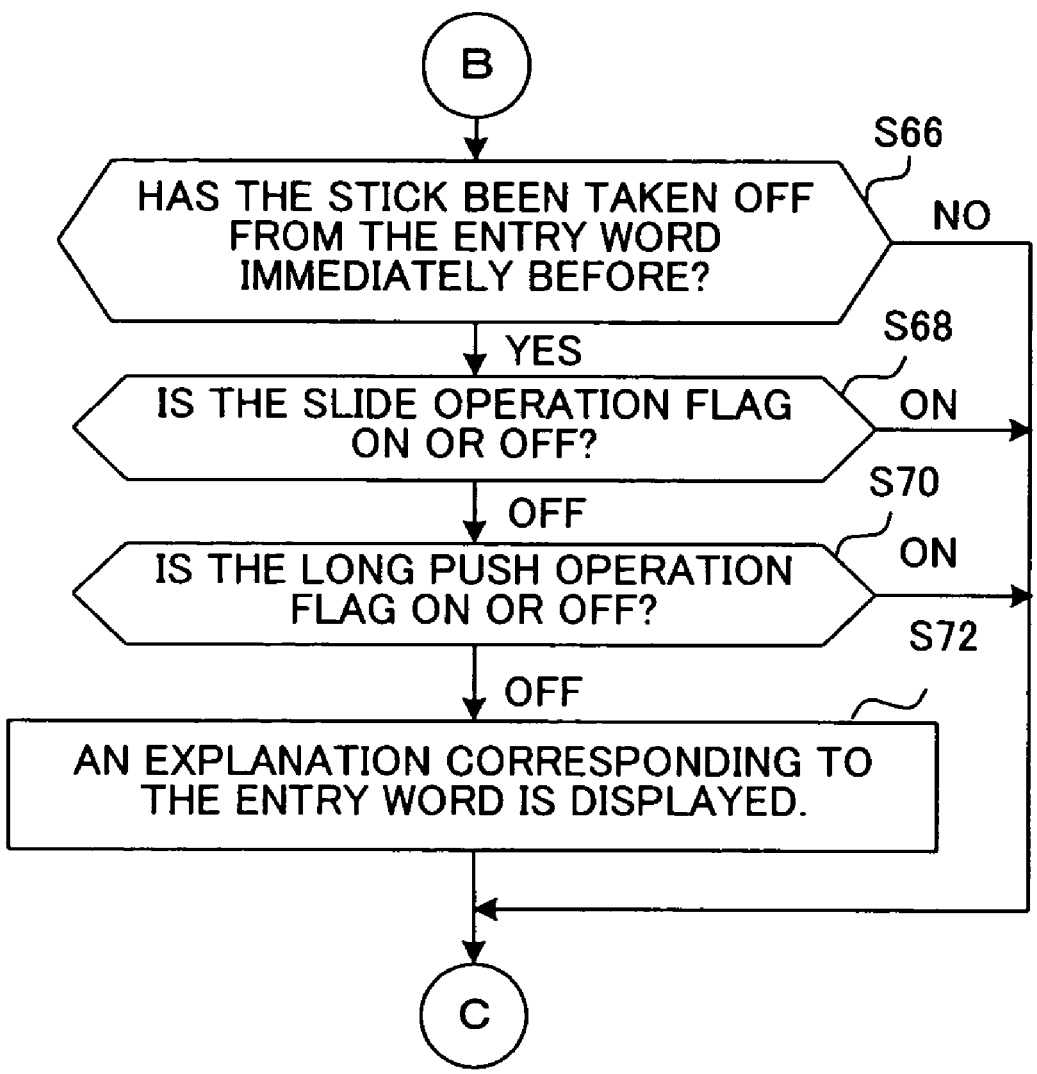
FIG. 19 shows a part of the flowchart illustrating the flow of processing based on the electronic dictionary program 51.

In step S32, the current touch coordinate set 54 is stored as the starting point coordinate set 56, and the processing advances to step S66 in FIG. 19.

In step S34, it is determined whether the long push operation flag 58 is on or off. When the long push operation flag 58 is on (i. e., when a page has been turned by the long push operation), the processing advances to step S46. When the long push operation flag 58 is off (i.e., when no page has been turned by the long push operation), the processing advances to step S36.

In step S36, it is determined whether the slide operation flag 57 is on or off. When the slide operation flag 57 is on (i.e., when a page has already been turned by the slide operation), the processing advances to step S46. When the slide operation flag 57 is off (i.e., when no page has been turned by the slide operation), the processing advances to step S38.

In step S38, it is determined whether or not a distance between the current touch coordinate set 54 and the starting point coordinate set is equal to or longer than a predetermined threshold value A. When the distance is equal to or longer than the threshold value A (i.e., when the slide operation by a predetermined distance or longer has been performed), the processing advances to step S40. When the distance is not longer than the threshold value A, the processing advances to step S46.

In step S40, slide page turning processing is executed. The slide page turning processing will be described later.

In step S42, the slide operation flag 57 is turned on.

In step S44, the long push time period is reset to zero.

In step S46, the current touch coordinate set 54 and the previous-frame touch coordinate set 55 are referred to, and it is determined whether or not the moving distance of the touch coordinate set from the immediately previous frame is less than a predetermined threshold value B. When the moving distance of the touch coordinate set from the immediately previous frame is less than the predetermined threshold value B (i.e., when the stick 16 stops or moves only relatively slowly), the long push time period 60 is incremented in step S48 and the processing advances to step S52. When the moving distance of the touch coordinate set from the immediately previous frame is not less than the predetermined threshold value B (i.e., when the stick 16 moves relatively fast), the long push time period 60 is reset to zero in step S50 and the processing advances to step S52.

In step S52, it is determined whether the long push operation flag 58 is on or off. When the long push operation flag 58 is on (i.e., a page has already been turned by the long push operation), the processing advances to step S60. When the long push operation flag 58 is off (i.e., no page has been turned by the long push operation), the processing advances to step S54.

In step S54, it is determined whether or not the long push time period 60 has reached a predetermined threshold C. When the long push time period 60 has reached the predetermined threshold C, the processing advances to step S55. When the long push time period 60 has not reached the predetermined threshold C, the processing advances to step S66 in FIG. 19.

In step S55, long push page turning processing is executed. The long push page turning processing will be described later.

In step S56, the long push operation flag 58 is turned on.

In step S58, the page timer is caused to start counting, and the processing advances to step S66 in FIG. 19.

In step S60, it is determined whether or not the count value 61 of the page timer has exceeded the page turning interval 59. When the count value 61 has exceeded the page turning interval 59, the processing advances to step S62. When the count value 61 has not exceeded the page turning interval 59, the processing advances to step S66.

In step S62, the page turning interval 59 is decreased by a predetermined period. Thus, the page turning interval in the continued page turning mode is gradually reduced each time a page is turned. In the case where the page turning interval 59 has already reached a predetermined lower limit, the processing in step S62 may be omitted.

In step S64, the long push page turning processing is executed, and the processing advances to step S66 show in FIG. 19. Again, the long push page turning processing will be described later.

In step S66 in FIG. 19, it is determined whether or not the stick 16 has been taken off from an entry word displayed on the entry word candidate display area 42 immediately before. This determination can be made by, for example, referring to the previous-frame touch coordinate set 55 and the current touch coordinate set 54. When the stick 16 has been taken off from an entry word immediately before, the processing advances to step S68. Otherwise, the processing returns to step S12 in FIG. 16.

In step S68, it is determined whether the slide operation flag 57 is on or off. When the slide operation flag 57 is on (i.e., when a page has already been turned by the slide operation), the processing returns to step S12 in FIG. 16. When the slide operation flag 57 is off (i.e., when no page has been turned by the slide operation), the processing advances to step S70.

In step S70, it is determined whether the long push operation flag 58 is on or off. When the long push operation flag 58 is on (i.e., when a page has already been turned by the long push operation), the processing returns to step S12 in FIG. 16. When the long push operation flag 58 is off (i.e., when no page has been turned by the long push operation), the processing advances to step S72.

In step S72 (i.e., when the user takes the stick 16 off from an entry word without any page being turned by the slide operation or the long push operation), the explanation data 53 is referred to, and an explanation sentence corresponding to the entry word represented by the previous-frame touch coordinate set 55 is displayed on the explanation sentenced is play area 40. Then, the processing returns to step S12 in FIG. 16.

Next, with reference to the flowchart in FIG. 20, the slide page turning processing will be described in detail. The flowchart in FIG. 20 illustrating the slide page turning processing is common to step S40 in FIG. 18 and step S98 in FIG. 21 described later.

Figure 20:
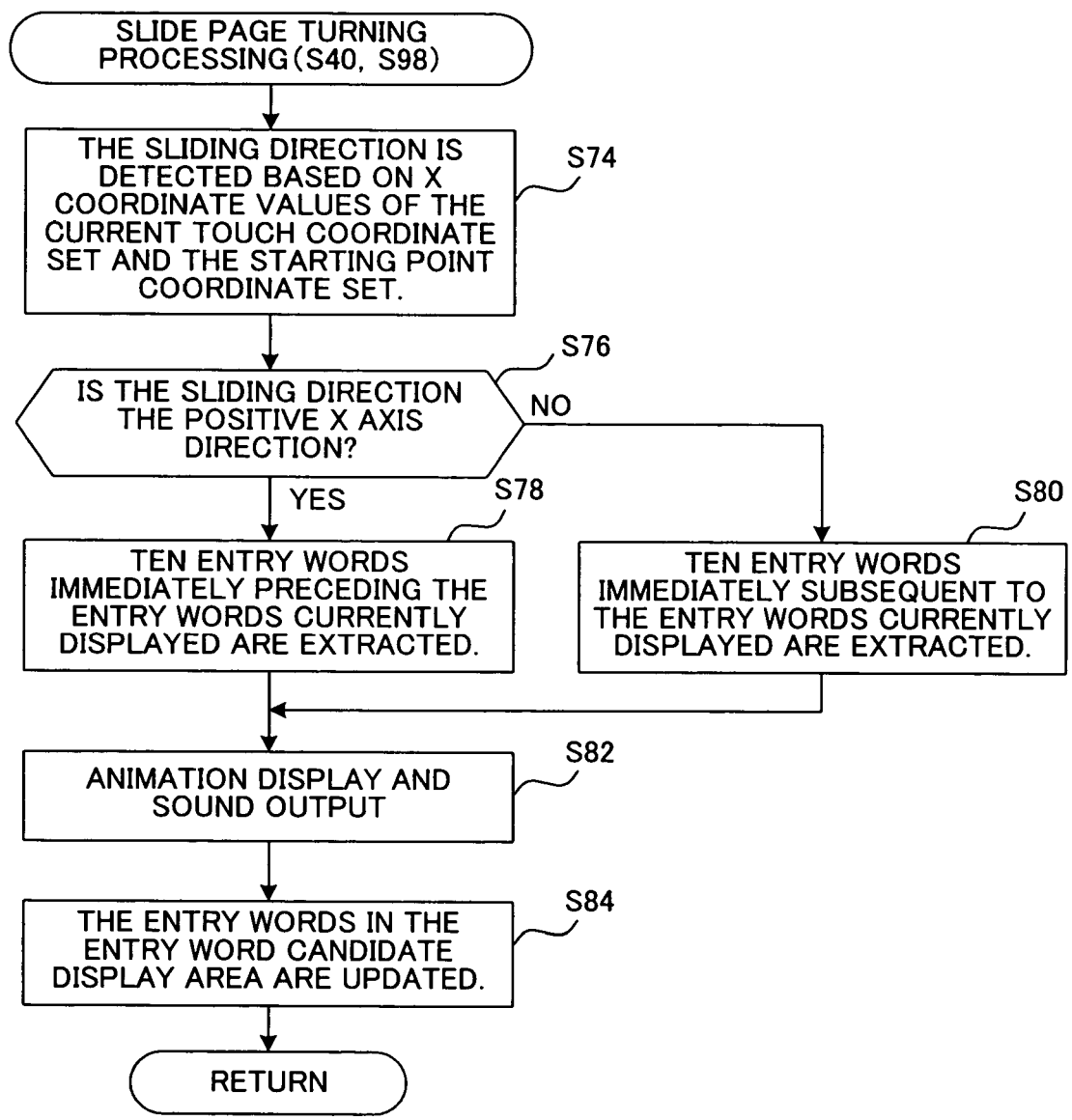
FIG. 20 shows a flowchart illustrating a flow of slide page turning processing.

Referring to FIG. 20, in step S74, X coordinate values of the current touch coordinate set 54 and the starting point coordinate set 56 are compared to each other to determine a sliding direction.

In step S76, it is determined whether or not the determined sliding direction is the positive X axis direction shown in FIG. 6. When the sliding direction is the positive X axis direction, the processing advances to step S78. When the sliding direction is the negative X axis direction, the processing advances to step S80.

In step S78, ten entry words immediately preceding the entry words currently displayed in the entry word candidate display area 42 are extracted. For example, in the case where the entry words which are ordered at the 196th position through the 205th position in FIG. 17 are currently displayed in the entry word candidate display area 42, the entry words which are ordered at the 186th position through the 195th position are extracted.

In step S80, ten entry words immediately subsequent to the entry words currently displayed in the entry word candidate display area 42 are extracted. For example, in the case where the entry words which are ordered at the 196th position through the 205th position are currently displayed in the entry word candidate display area 42, the entry words which are ordered at the 206th position through the 215th position are extracted.

In step S82, an animation is displayed based on the animation image data 62, and a sound is output based on the sound data 63. The animation is displayed symmetrically in the left and right pages which are simultaneously displayed on the screen.

In step S84, the entry words in the entry word candidate display area 42 are updated using the entry words extracted in step S78 or S80, and the slide page turning processing is terminated.

Next, with reference to the flowchart in FIG. 21, the long push page turning processing will be described in detail. The flowchart in FIG. 21 illustrating the long push page turning processing is common to steps S55 and S64 in FIG. 18.

Figure 21:
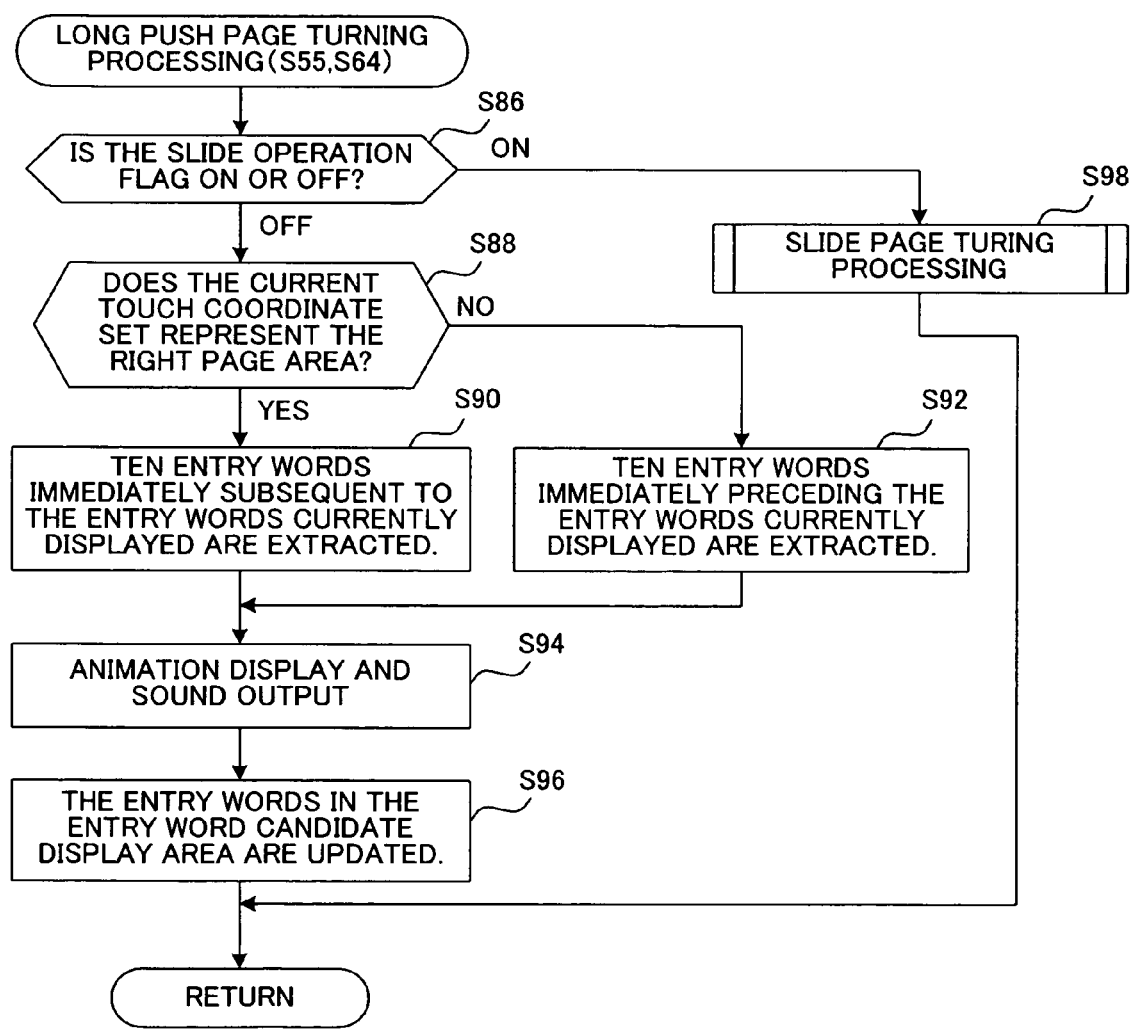
FIG. 21 shows a flowchart illustrating a flow of long push page turning processing.

Referring to FIG. 21, in step S86, it is determined whether the slide operation flag 57 is on or off. When the slide operation flag 57 is on (i.e., when a page has already been turned by the slide operation), the processing advances to step S98. When the slide operation flag 57 is off (i.e., when no page has been turned by the slide operation), the processing advances to step S88.

In step S88, it is determined whether or not the current touch coordinate set 54 represents the right page area 42R. When the current touch coordinate set 54 represents the right page area 42R, the processing advances to step S90. When the current touch coordinate set 54 represents the left page area 42L, the processing advances to step S92.

In step S90, ten entry words immediately subsequent to the entry words currently displayed in the entry word candidate display area 42 are extracted. For example, in the case where the entry words which are ordered at the 196th position through the 205th position in FIG. 17 are currently displayed in the entry word candidate display area 42, the entry words which are ordered at the 206th position through the 215th position are extracted.

In step S92, ten entry words immediately preceding the entry words currently displayed in the entry word candidate display area 42 are extracted. For example, in the case where the entry words which are ordered at the 196th position through the 205th position are currently displayed in the entry word candidate display area 42, the entry words which are ordered at the 186th position through the 195th position are extracted.

In step S94, an animation is displayed based on the animation image data 62, and a sound is output based on the sound data 63. The animation is displayed symmetrically in the left and right pages which are simultaneously displayed on the screen.

In step S96, the entry words in the entry word candidate display area 42 are updated using the entry words extracted in step S90 or S92, and the long push page turning processing is terminated.

In step S98, the slide page turning processing is executed.

The slide page turning processing in step S98 is continued page turning processing executed by the user continuing the stick 16 in touch with the touch panel 15 after a page is turned by the slide operation without taking the stick 16 from the touch panel 15. By contrast, the long push page turning processing in steps 88 through S96 is continued page turning processing executed by the user keeping the stick 16 in touch with the touch panel 15 after a page is turned by the long push operation without taking the stick 16 from the touch panel 15. The two types of continued page turning processing are different on the following point. With the former, the direction in which the pages are turned is determined based on the positional relationship between the current touch coordinate set and the starting point coordinate set. With the latter, the direction in which the pages are turned is determined only based on the current touch coordinate set. The reason for varying how the page turning direction is determined is to avoid the situation where, for example, when the user first performs a slide operation as shown in FIG. 6 and then continues the stick 16 in touch with the touch panel 15, a page is first turned leftward and then a plurality of pages are turned in the opposite direction. Such a situation confuses the user.

In this embodiment, when the user performs a predetermined entry word change operation, all the ten entry words in the entry word candidate display area 42 are updated into new entry words. The present invention is not limited to this. For example, each time the entry word change operation is performed, a predetermined number of entry words (for example, one entry word or five entry words) among the entry words displayed in the entry word candidate display area 42 may be updated. In this case, the entry words may be updated as follows. A predetermined number of entry words from a most forward entry word in the entry word candidate display area 42 or from a most rearward entry word in the entry word candidate display area 42 are erased, the positions of the remaining entry words are displaced, and the predetermined number of new entry words immediately preceding or immediately subsequent to the remaining entry words are displayed.

In this embodiment, the entry words are displayed in the entry word candidate display area 42 provided in the form of two pages of an open book. The present invention is not limited to this, and the entry words may be displayed in the entry word candidate display area 42 provided in the form of one sheet of paper.

Figure 22:
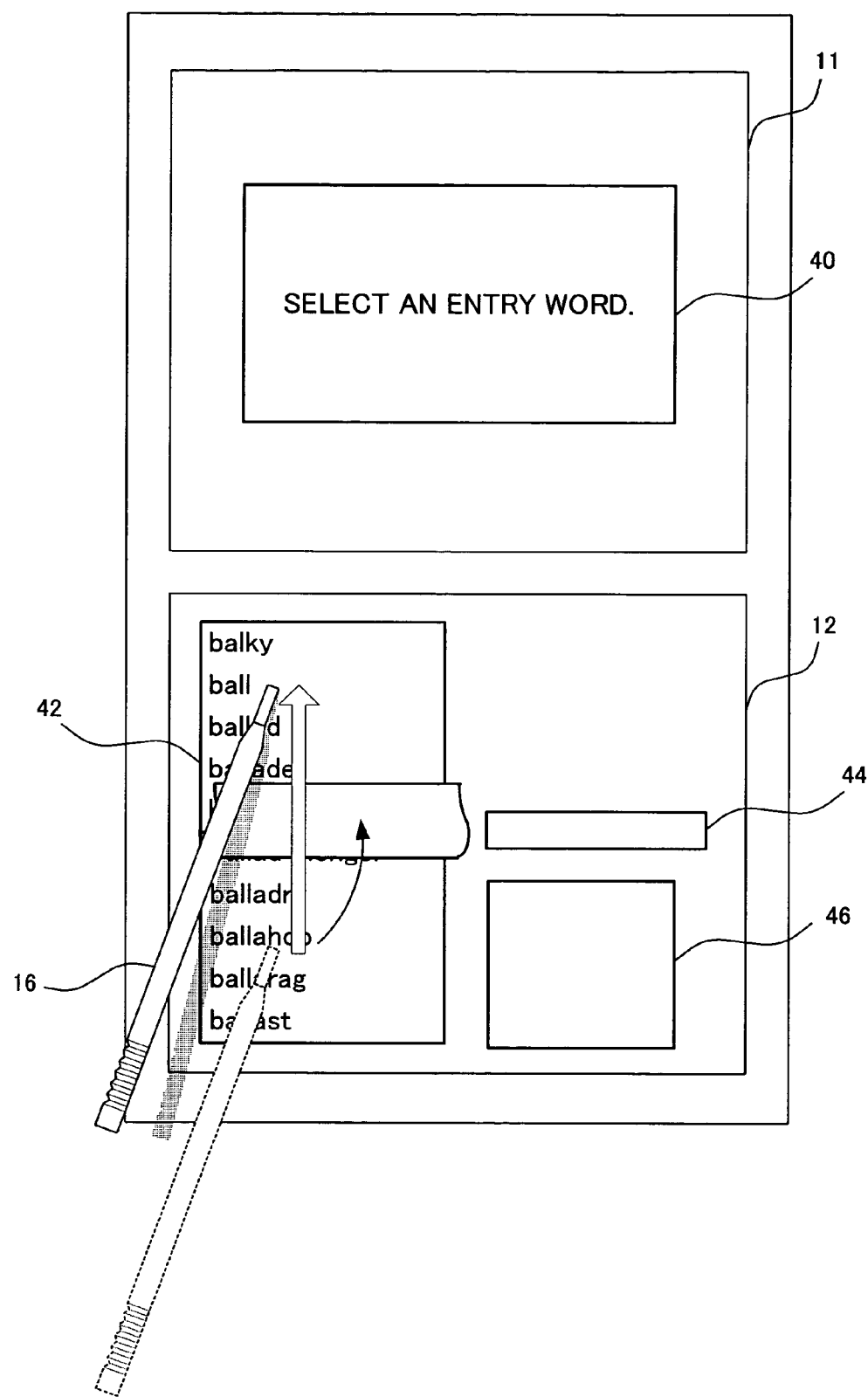
FIG. 22 shows an example of a display according to another embodiment of the present invention.

In this embodiment, the pages are turned leftward or rightward on the screen. The present invention is not limited to this. As shown in FIG. 22, the pages may be turned upward or downward on the screen. In this case, the sliding direction of the slide operation can be determined by comparing Y axis coordinate values of the current touch coordinate set 54 and the starting point coordinate set 56.

In this embodiment, a predetermined number of continuous entry words starting from an entry word corresponding to the character string which is input to the text box 44 are extracted from the entry word data 52 and displayed in the entry word candidate display area 42. The present invention is not limited to this, and the entry words maybe displayed, for example, as in the following modification. Entry words including the character string input to the text box 44 are once extracted from the entry word data 52 (the entry words extracted in this manner are not necessary continuous in terms of the positions in the order), and a part of the entry words thus extracted are displayed in the entry word candidate display area 42. Namely, in the embodiment described above, entry words which do not include the character string input to the text box 44 maybe displayed by turning a page. By contrast, in the modification, only the entry words including the character string input to the text box 44 are displayed.

In this embodiment, two operations, i.e., the slide operation and the long push operation are prepared as the entry word change operation. The present invention is not limited to this. At least one of the slide operation and the long push operation may be prepared.

Figure 23:
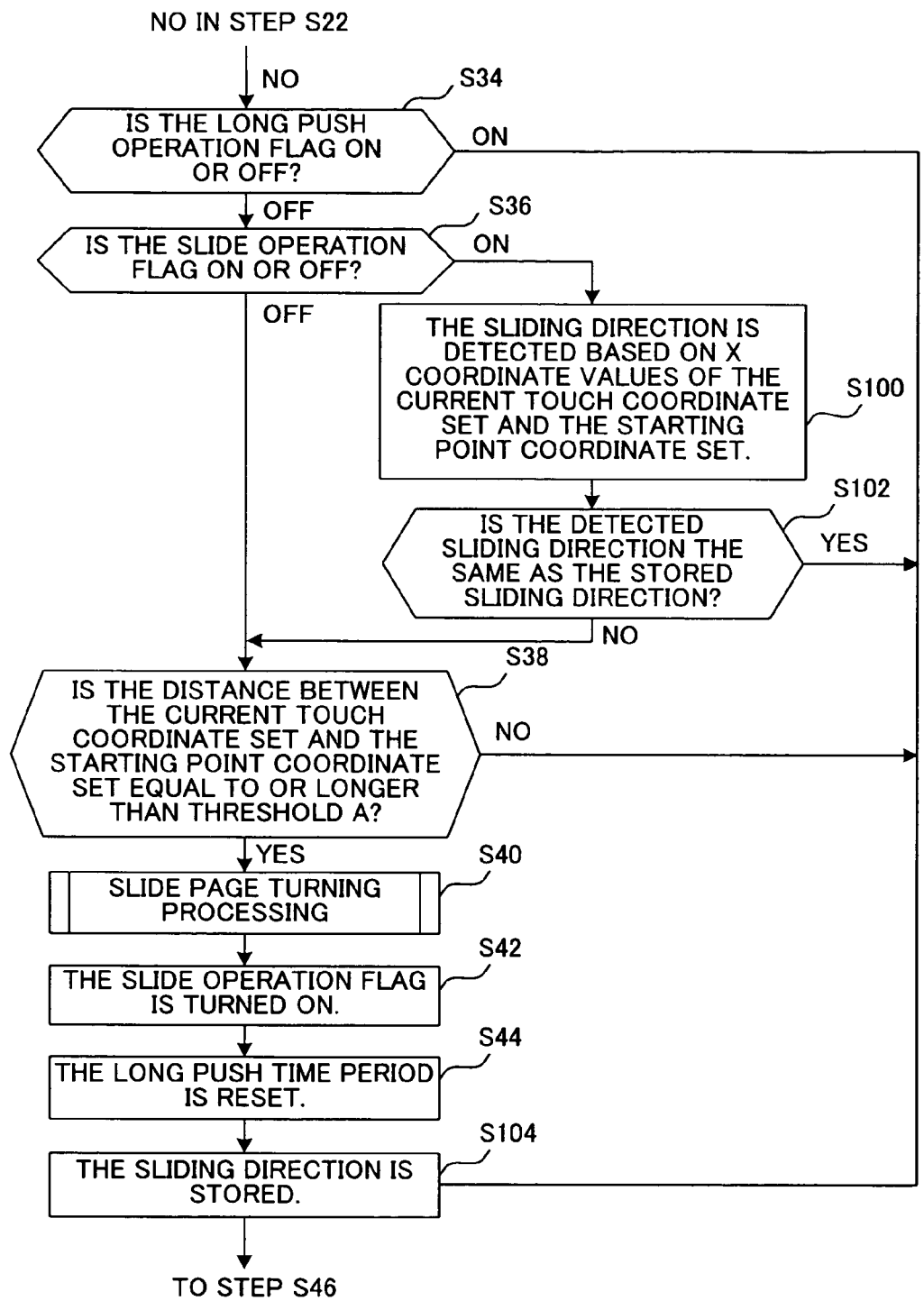
FIG. 23 is a flowchart according to still another embodiment of the present invention.

In this embodiment, when a page is turned by the slide operation, another page is not turned unless the stick 16 is once taken off from the touch panel 15, or unless the stick 16 is kept in touch with the touch panel 15 (i.e., the long push operation is performed) to realize the continued page turning mode. Considering that the user may inadvertently perform the slide operation, it is convenient if a method for displaying the page before the inadvertent slide operation quickly is prepared. Such a method can be provided by, for example, modifying the processing in steps S34 through S44 in FIG. 18 as shown in FIG. 23. In FIG. 23, three steps S100, S102 and S104 are added to the steps shown in the flowchart in FIG. 18. In step S104, the sliding direction of the slide operation performed in step S40 is stored in an arbitrary storage area of the RAM 24. In step S100, the sliding direction is detected based on the X coordinate values of the current touch coordinate set 54 and the starting point coordinate set 56. In step S102, it is determined whether or not the sliding direction detected in step S103 is the same as the sliding direction stored on the RAM 24 in step S104. When the two sliding directions are the same, the processing advances to step S46. When the two sliding directions are different, the processing advances to step S38. By modifying the flowchart in FIG. 18 in this manner, even when the user inadvertently performs the slide operation to turn a page, the page can be immediately turned in the opposite direction to display the page before the inadvertent slide operation, by sliding the stick 16 in the opposite direction without taking the stick 16 off from the touch panel 15.

While the invention has been described in detail, the foregoing description is in all aspects illustrative and not restrictive. It is understood that numerous other modifications and variations can be devised without departing from the scope of the invention.

What is claimed is:

1. A computer readable storage medium having stored thereon an information processing program for causing a computer, connected to display means, coordinate set input means for inputting a coordinate set input instruction from a user, entry word data storage means for storing entry word data including a plurality of entry words, and explanation data storage means for storing explanation data associated with each of the plurality of entry words, to function as:

first display control means for displaying, in an entry word candidate display area, a part of the plurality of entry words included in the entry word data;

entry word change operation detection means for determining at least one of (a) whether or not a slide operation has been performed in the entry word candidate display area and (b) whether or not a long push operation has been performed in the entry word candidate display area, based on an output signal from the coordinate set input means, and detecting an entry word change operation by the user based on the determination result;

second display control means for, when the entry word change operation by the user is detected by the entry word change operation detection means, erasing at least one entry word displayed in the entry word candidate display area and displaying a new entry word; and third display control means for, when the coordinate set input instruction is terminated on an entry word displayed in the entry word candidate display area based on an output signal from the coordinate set input means, reading the explanation data corresponding to the entry word and displaying an explanation of the entry word on the display means under a condition that no new entry word has been displayed by the second display control means at least in a time period from a start of the coordinate set input instruction until a termination thereof.

2. A computer readable storage medium according to claim 1, wherein when the slide operation is performed by a predetermined distance or longer in the entry word candidate display area, the entry word change operation detection means detects the slide operation as the entry word change operation by the user.

3. A computer readable storage medium according to claim 2, wherein:

the entry word data includes the plurality of entry words which are sequentially ordered from a first entry word to a final entry word;

the entry word change operation detection means detects a direction of the slide operation when the slide operation is performed by the predetermined distance or longer in the entry word candidate display area; and (a) when the direction of the slide operation detected by the entry word change operation detection means is a first direction, the second display control means erases at least an entry word displayed at a most forward position in the entry word candidate display area, and displays a new entry word subsequent to an entry word displayed at a most rearward position in the entry word candidate display area; and (b) when the direction of the slide operation detected by the entry word change operation detection means is a second direction opposite to the first direction, the second display control means erases at least an entry word displayed at the most rearward position in the entry word candidate display area, and displays a new entry word preceding an entry word displayed at the most forward position in the entry word candidate display area.

4. A computer readable storage medium according to claim 2, wherein the second display control means executes entry word change processing repeatedly while the user keeps the coordinate set input instruction after the slide operation by the predetermined distance or longer is detected by the entry word change operation detection means.

5. A computer readable storage medium according to claim 4, wherein:

the entry word data includes the plurality of entry words which are sequentially ordered from a first entry word to a final entry word;

the entry word change operation detection means detects a direction of the slide operation when the slide operation is performed by the predetermined distance or longer in the entry word candidate display area; and during entry word change processing executed repeatedly, (a) when a direction from an input coordinate set when the coordinate set input instruction is started by the user to an input coordinate set represented by an output signal from the coordinate set input means is a first direction, the second display control means erases at least an entry word displayed at a most forward position in the entry word candidate display area, and displays a new entry word subsequent to an entry word displayed at a most rearward position in the entry word candidate display area; and (b) when the direction from an input coordinate set when the coordinate set input instruction is started by the user to an input coordinate set represented by an output signal from the coordinate set input means is a second direction opposite to the first direction, the second display control means erases at least an entry word displayed at the most rearward position in the entry word candidate display area, and displays a new entry word preceding an entry word displayed at the most forward position in the entry word candidate display area.

6. A computer readable storage medium according to claim 2, wherein:

the entry word data includes the plurality of entry words which are sequentially ordered from a first entry word to a final entry word;

the first display control means assigns the entry words included in the entry word data to virtual book pages, displays an entry word assigned to an N'th page (where N is an integer equal to or greater than 3) in a first sub area of the entry word candidate display area, and displays an entry word assigned to an (N+1)'th page in a second sub area of the entry word candidate display area;

the entry word change operation detection means detects a direction of the slide operation when the slide operation is performed by the predetermined distance or longer in the entry word candidate display area; and (a) when the direction of the slide operation detected by the entry word change operation detection means is a direction from the second sub area to the first sub area, the second display control means replaces the entry word displayed in the first sub area with an entry word assigned to an (N+2)'th page and replaces the entry word displayed in the second sub area with an entry word assigned to an (N+3)'th page; and (b) when the direction of the slide operation detected by the entry word change operation detection means is a direction from the first sub area to the second sub area, the second display control means replaces the entry word displayed in the first sub area with an entry word assigned to an (N−2)'th page and replaces the entry word displayed in the second sub area with an entry word assigned to an (N−1)'th page.

7. A computer readable storage medium according to claim 1, wherein when the long push operation is performed for a predetermined time period or longer in the entry word candidate display area, the entry word change operation detection means detects the long push operation as the entry word change operation by the user.

8. A computer readable storage medium according to claim 7, wherein:

the entry word data includes the plurality of entry words which are sequentially ordered from a first entry word to a final entry word;

when the long push operation is performed for the predetermined time period or longer in the entry word candidate display area, the entry word change operation detection means detects which of the first sub area and the second sub area of the entry word candidate display area is represented by the input coordinate set from the coordinate set input means; and (a) when the input coordinate set from the coordinate set input means represents the second sub area, the second display control means erases at least an entry word displayed at a most forward position in the entry word candidate display area, and displays a new entry word subsequent to an entry word displayed at a most rearward position in the entry word candidate display area; and (b) when the input coordinate set from the coordinate set input means represents the first sub area, the second display control means erases at least an entry word displayed at the most rearward position in the entry word candidate display area, and displays a new entry word preceding an entry word displayed at the most forward position in the entry word candidate display area.

9. A computer readable storage medium according to claim 8, wherein:

when the slide operation is performed by the predetermined distance or longer in the entry word candidate display area, the entry word change operation detection means detects the slide operation as the entry word change operation by the user; and the second display control means does not execute entry word change processing depending on which of the first sub area and the second sub area of the entry word candidate display area is represented by the input coordinate set from the coordinate set input means, while the user keeps the coordinate set input instruction after the slide operation by the predetermined distance or longer is detected by the entry word change operation detection means.

10. A computer readable storage medium according to claim 7, wherein the second display control means executes entry word change processing repeatedly while the user keeps the coordinate set input instruction after the long push operation for the predetermined time period is detected by the entry word change operation detection means.

11. A computer readable storage medium according to claim 10, wherein:

the entry word data includes the plurality of entry words which are sequentially ordered from a first entry word to a final entry word;

when the long push operation is performed for the predetermined time period or longer in the entry word candidate display area, the entry word change operation detection means detects which of the first sub area and the second sub area of the entry word candidate display area is represented by the input coordinate set from the coordinate set input means;

during entry word change processing executed repeatedly, (a) when the input coordinate set from the coordinate set input means currently represents the second sub area, the second display control means erases at least an entry word displayed at a most forward position in the entry word candidate display area, and displays a new entry word subsequent to an entry word displayed at a most rearward position in the entry word candidate display area; and (b) when the input coordinate set from the coordinate set input means currently represents the first sub area, the second display control means erases at least an entry word displayed at the most rearward position in the entry word candidate display area, and displays a new entry word preceding an entry word displayed at the most forward position in the entry word candidate display area.

12. A computer readable storage medium according to claim 7, wherein:
- the entry word data includes the plurality of entry words which are sequentially ordered from a first entry word to a final entry word;
- the first display control means assigns the entry words included in the entry word data to virtual book pages, displays an entry word assigned to an N'th page (where N is an integer equal to or greater than 3) in a first sub area of the entry word candidate display area, and displays an entry word assigned to an (N+1)'th page in a second sub area of the entry word candidate display area;
- when the long push operation is performed for the predetermined time period or longer in the entry word candidate display area, the entry word change operation detection means detects which of the first sub area and the second sub area of the entry word candidate display area is represented by the input coordinate set from the coordinate set input means; and
  - (a) when the input coordinate set from the coordinate set input means represents the second sub area, the second display control means replaces the entry word displayed in the first sub area with an entry word assigned to an (N+2)'th page and replaces the entry word displayed in the second sub area with an entry word assigned to an (N+3)'th page; and (b) when the input coordinate set from the coordinate set input means represents the first sub area, the second display control means replaces the entry word displayed in the first sub area with an entry word assigned to an (N−2)'th page and replaces the entry word displayed in the second sub area with an entry word assigned to an (N−1)'th page.

13. A computer readable storage medium according to claim 1, wherein when the slide operation is performed by a predetermined distance or longer in the entry word candidate display area, or when the long push operation is performed for a predetermined time period or longer in the entry word candidate display area, the entry word change operation detection means detects the slide operation or the long push operation as the entry word change operation by the user.

14. A computer readable storage medium according to claim 13, wherein:
- the entry word data includes the plurality of entry words which are sequentially ordered from a first entry word to a final entry word;
- when the slide operation is performed by the predetermined distance or longer in the entry word candidate display area, the entry word change operation detection means detects a direction of the slide operation; and when the long push operation is performed for the predetermined time period or longer in the entry word candidate display area, the entry word change operation detection means detects which of a first sub area and a second sub area of the entry word candidate display area is represented by the input coordinate set from the coordinate set input means; and
  - (a) while the user keeps the coordinate set input instruction after the slide operation by the predetermined distance or longer is detected by the entry word change operation detection means, the second display control means changes an entry word in accordance with a direction from an input coordinate set when the coordinate set input instruction is started by the user to an input coordinate set represented by an output signal from the coordinate set input means; and (b) while the user keeps the coordinate set input instruction after the long push operation for the predetermined time period or longer is detected by the entry word change operation detection means, the second display control means changes an entry word in accordance with which of the first sub area and the second sub area is currently represented by an input coordinate set from the coordinate set input means.

15. A computer readable storage medium according to claim 1, wherein the first display control means displays the entry words in the entry word candidate display area in the form of an open book.

16. A computer readable storage medium according to claim 1, wherein the second display control means erases all the entry words displayed in the entry word candidate display area and displays new entry words.

17. A computer readable storage medium according to claim 16, wherein:
- the entry word data includes the plurality of entry words which are sequentially ordered from a first entry word to a final entry word; and
- the second display control means newly displays an entry word subsequent to the entry words currently displayed in the entry word candidate display area.

18. A computer readable storage medium according to claim 16, wherein the information processing program further causes the computer to function as:
- animation control means for, when the second display control means changes the entry words displayed in the entry word candidate display area, displaying an animation of a page of a book being turned in the entry word candidate display area; and
- sound control means for outputting a sound of a page of a book being turned along with the animation displayed by the animation control means.

19. A computer readable storage medium according to claim 1, wherein:
- the information processing program further causes the computer to function as search data input means for inputting search data based on an input operation by the user; and
- the entry word data includes the plurality of entry words which are sequentially ordered from a first entry word to a final entry word; and
- the first display control means specifies one entry word corresponding to the search data from the plurality of entry words and displays the one corresponding entry word and at least one entry word subsequent to the one corresponding entry word.

20. A computer readable storage medium according to claim 1, wherein the second display control means executes entry word change processing repeatedly while the user keeps the coordinate set input instruction after the long push operation is detected by the entry word change operation detection means.

21. A computer readable storage medium according to claim 20, wherein a period of the entry word change processing by the second display control means is shortened as time passes.

22. An information processing apparatus, comprising:

display means;

coordinate set input means for inputting a coordinate set input instruction from a user;

entry word data storage means for storing entry word data including a plurality of entry words;

explanation data storage means for storing explanation data associated with each of the plurality of entry words;

first display control means for displaying, in an entry word candidate display area, a part of the plurality of entry words included in the entry word data;

entry word change operation detection means for determining at least one of (a) whether or not a slide operation has been performed in the entry word candidate display area and (b) whether or not a long push operation has been performed in the entry word candidate display area, based on an output signal from the coordinate set input means, and detecting an entry word change operation by the user based on the determination result;

second display control means for, when the entry word change operation by the user is detected by the entry word change operation detection means, erasing at least one entry word displayed in the entry word candidate display area and displaying a new entry word; and third display control means for, when the coordinate set input instruction is terminated on an entry word displayed in the entry word candidate display area based on an output signal from the coordinate set input means, reading explanation data corresponding to the entry word and displaying an explanation of the entry word on the display means under a condition that no new entry word has been displayed by the second display control means at least in a time period from a start of the coordinate set input instruction until a termination thereof.

* * * * *